US008885870B2

(12) United States Patent
Matsushita et al.

(10) Patent No.: US 8,885,870 B2
(45) Date of Patent: Nov. 11, 2014

(54) INFORMATION PROCESSING DEVICE AND COMPUTER PROGRAM PRODUCT

(75) Inventors: Tatsuyuki Matsushita, Tokyo (JP); Nakaba Kogure, Kanagawa (JP); Fangming Zhao, Tokyo (JP); Kentaro Umesawa, Kanagawa (JP); Toru Kambayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 316 days.

(21) Appl. No.: 13/207,572

(22) Filed: Aug. 11, 2011

(65) Prior Publication Data

US 2012/0063635 A1    Mar. 15, 2012

(30) Foreign Application Priority Data

Sep. 14, 2010  (JP) ................................ 2010-206118

(51) Int. Cl.
| | | |
|---|---|---|
| G06K 9/00 | (2006.01) | |
| G06T 1/00 | (2006.01) | |
| G10L 19/018 | (2013.01) | |

(52) U.S. Cl.
CPC .............. *G06T 1/0028* (2013.01); *G06T 1/0085* (2013.01); *G10L 19/018* (2013.01)
USPC ......................................................... 382/100

(58) Field of Classification Search
None
See application file for complete search history.

(56) References Cited

U.S. PATENT DOCUMENTS

| | | | |
|---|---|---|---|
| 6,711,293 B1 | 3/2004 | Lowe | |
| 2001/0030759 A1* | 10/2001 | Hayashi et al. | ................. 358/1.9 |
| 2003/0021444 A1* | 1/2003 | Echizen et al. | ................ 382/100 |
| 2006/0204030 A1 | 9/2006 | Kogure et al. | |

FOREIGN PATENT DOCUMENTS

| | | |
|---|---|---|
| JP | 2004-096476 | 3/2004 |
| JP | 2004-519015 | 6/2004 |
| JP | 2005-086349 | 3/2005 |
| JP | 2006-140934 | 6/2006 |
| JP | 2006-229857 | 8/2006 |
| JP | 2006-254147 | 9/2006 |
| JP | 2007-157064 | 6/2007 |
| JP | 2010-141591 | 6/2010 |
| WO | 02/065782 A1 | 8/2002 |
| WO | 2005/079072 A1 | 8/2005 |

OTHER PUBLICATIONS

Tardos. Optimal Probabilistic Fingerprint Codes, Proceedings of the 35th Annual ACM Symposium on Theory of Computing, pp. 116-125.
Gilbert. Cyclically Permutable Error-Correcting Codes, IEEE Trans. Inform. Theory, vol. 9, pp. 175-182.

* cited by examiner

*Primary Examiner* — Atiba O Fitzpatrick
(74) *Attorney, Agent, or Firm* — Amin, Turocy & Watson, LLP

(57) ABSTRACT

According to an embodiment, an information processing device includes: an extracting unit configured to extract a feature quantity of a content; a first detecting unit configured to detect a point in the content where variation of the feature quantity is a first predetermined amount or more; a second detecting unit configured to detect components of watermark information including components corresponding to respective intervals based on the point; a determining unit configured to determine a reliability of the watermark information that is detected; and a selecting unit configured to select a first watermark information from the watermark information based on a result of determination determined by the determining unit.

3 Claims, 18 Drawing Sheets

FIG.3
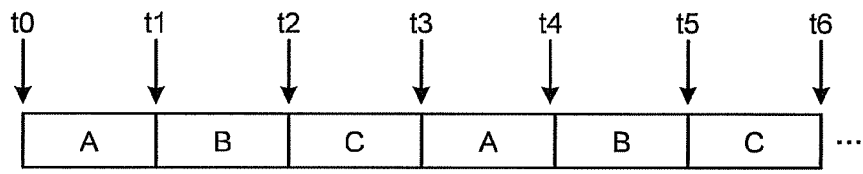
FIG.4
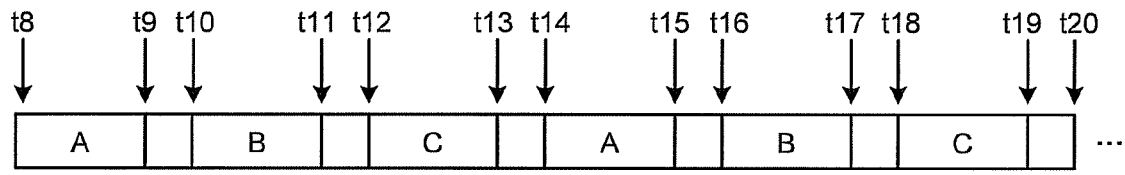
FIG.5
| CONTENT IDENTIFICATION INFORMATION | 1234 |
|---|---|
| DIGITAL WATERMARK EMBEDDING STRENGTH | SN RATIO 45 dB |
| DIGITAL WATERMARK EMBEDDED INTERVAL | t1−t0=1 (MIN)<br>t2−t1=1 (MIN)<br>t3−t2=1 (MIN) |
| INITIAL VECTOR | (A, B, C) |
FIG.6
| CONTENT IDENTIFICATION INFORMATION | 1234 |
|---|---|
| INITIAL VECTOR | (A, B, C) |

FIG.7
| CONTENT IDENTIFICATION INFORMATION | 1234 | |
|---|---|---|
| | SCREEN LEFT | SCREEN RIGHT |
| DIGITAL WATERMARK EMBEDDING STRENGTH | SN RATIO 45 dB | SN RATIO 50 dB |
| DIGITAL WATERMARK EMBEDDING PERIOD | $t_1-t_0=1$ (MIN) $t_2-t_1=1$ (MIN) $t_3-t_2=1$ (MIN) | $t'_1-t'_0=1$ (MIN) $t'_2-t'_1=1$ (MIN) $t'_3-t'_2=1$ (MIN) |
| INITIAL VECTOR | (A, B, C) | (D, E, F) |
FIG.8
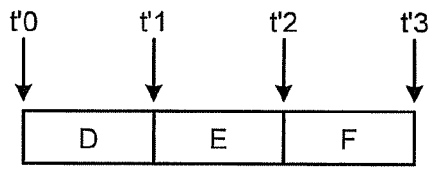
FIG.9
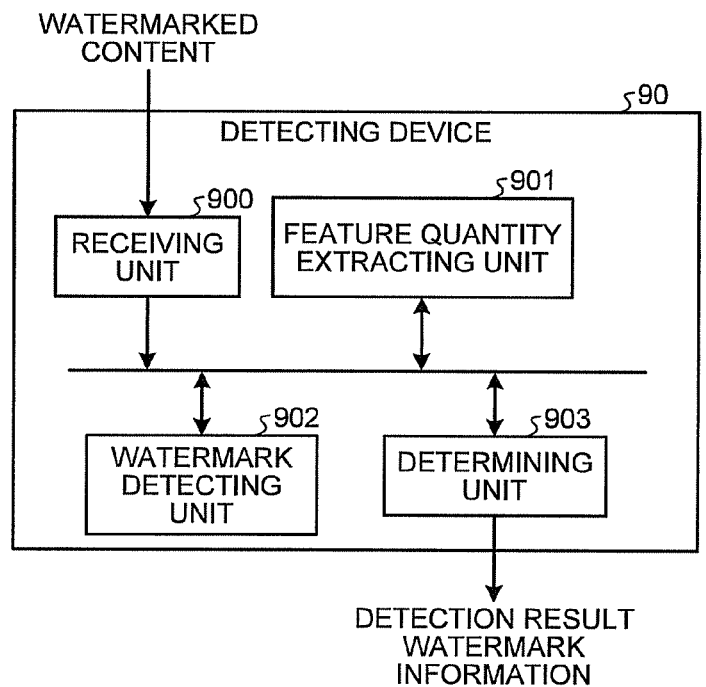

FIG.15

| CONTENT IDENTIFICATION INFORMATION | 4321 |
|---|---|
| SCENE CHANGE POINT | (FROM BEGINNING OF CONTENT) 10 SECONDS<br>2 MINUTES AND 20 SECONDS<br>3 MINUTES AND 30 SECONDS<br>... |

FIG.16

| CONTENT IDENTIFICATION INFORMATION | 4321 |
|---|---|
| SCENE CHANGE POINT INTERVAL | 2 MINUTES AND 10 SECONDS<br>1 MINUTE AND 10 SECONDS<br>... |

FIG.17

| CONTENT IDENTIFICATION INFORMATION | 5678 | | | |
|---|---|---|---|---|
| | UPPER-LEFT REGION | LOWER-LEFT REGION | UPPER-RIGHT REGION | LOWER-RIGHT REGION |
| SCENE CHANGE POINT | (FROM BEGINNING OF CONTENT) 1000-TH FRAME<br>2000-TH FRAME<br>2800-TH FRAME<br>... | (FROM BEGINNING OF CONTENT) 100-TH FRAME<br>2000-TH FRAME<br>2500-TH FRAME<br>... | (FROM BEGINNING OF CONTENT) 300-TH FRAME<br>900-TH FRAME<br>2000-TH FRAME<br>... | (FROM BEGINNING OF CONTENT) 2000-TH FRAME<br>2500-TH FRAME<br>6000-TH FRAME<br>... |

| CONTENT IDENTIFICATION INFORMATION | 5678 | | | |
|---|---|---|---|---|
| | UPPER-LEFT REGION | LOWER-LEFT REGION | UPPER-RIGHT REGION | LOWER-RIGHT REGION |
| SCENE CHANGE POINT INTERVAL | 1000 FRAMES 800 FRAMES ... | | | |

| CONTENT IDENTIFICATION INFORMATION | 5678 |
|---|---|
| SCENE CHANGE POINT INTERVAL | 1000 FRAMES 800 FRAMES ... |

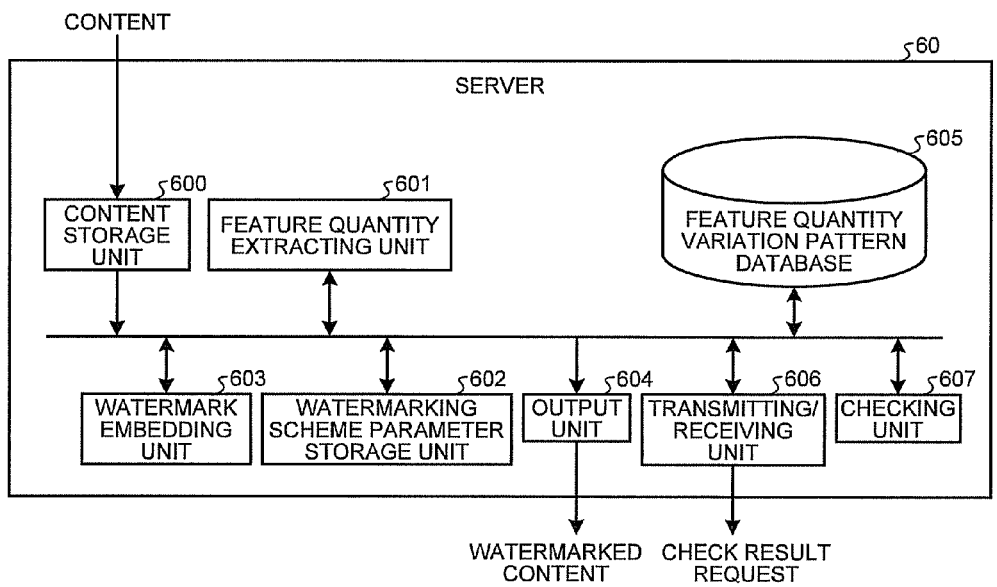

| CONTENT IDENTIFICATION INFORMATION | 1234 |
|---|---|
| DIGITAL WATERMARK EMBEDDING STRENGTH | SN RATIO 45 dB |
| DIGITAL WATERMARK EMBEDDED INTERVAL | t1-t0=1 (MIN)<br>t2-t1=1 (MIN)<br>t3-t2=1 (MIN) |
| INITIAL VECTOR | (A, B, C) |
| STARTING POINT OF EMBEDDING FIRST COMPONENT OF INITIAL VECTOR | 10 SECONDS FROM BEGINNING OF CONTENT<br>2 MINUTES AND 20 SECONDS<br>3 MINUTES AND 30 SECONDS<br>... |

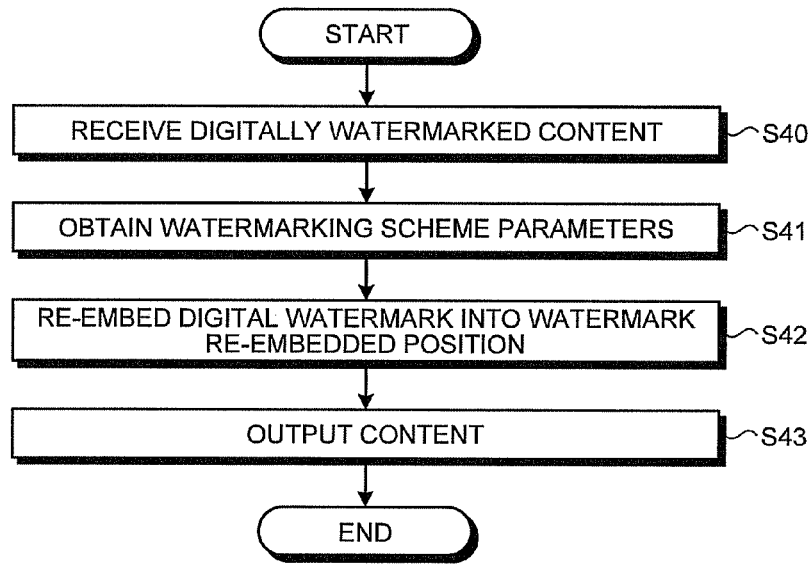

FIG.32

| CONTENT IDENTIFICATION INFORMATION | 1048 |
|---|---|
| DIGITAL WATERMARK EMBEDDING STRENGTH | SN RATIO 50 dB FROM BEGINNING OF CONTENT TO 3000-TH FRAME; SN RATIO 40 dB FROM 3001-TH FRAME TO 8000-TH FRAME; SN RATIO 45 dB FROM 8001-TH FRAME TO 15000-TH FRAME |
| DIGITAL WATERMARK RE-EMBEDDED INTERVAL | t9-t8=2 (MIN); t10-t9=30 (SEC); t11-t10=1 (MIN); t12-t11=10 (SEC); t13-t12=3 (MIN); t14-t13=1 (MIN); t15-t14=1 (MIN); t16-t15=20 (SEC); t17-t16=3 (MIN); t18-t17=50 (SEC); t19-t18=2 (MIN); t20-t19=2 (MIN); |
| INITIAL VECTOR | (A, B, C) |

FIG.33

| CONTENT IDENTIFICATION INFORMATION | 1234 |
|---|---|
| DIGITAL WATERMARK EMBEDDING STRENGTH | SN RATIO 35 dB OF EMBEDDING STRENGTH AT PEAK SIGNAL-TO-NOISE RATIO OF LESS THAN 50 dB SN RATIO 40 dB OF EMBEDDING STRENGTH AT PEAK SIGNAL-TO-NOISE RATIO OF 50 dB OR MORE AND LESS THAN 55 dB SN RATIO 45 dB OF EMBEDDING STRENGTH AT PEAK SIGNAL-TO-NOISE RATIO OF 55 dB OR MORE |
| DIGITAL WATERMARK RE-EMBEDDED INTERVAL | t1-t0=1 (MIN) t2-t1=1 (MIN) t3-t2=1 (MIN) |
| INITIAL VECTOR | (A, B, C) |

FIG.36

| CONTENT IDENTIFICATION INFORMATION | 4321 | | |
|---|---|---|---|
| SCENE CHANGE POINT AND HISTOGRAM VARIATION | (FROM BEGINNING OF CONTENT) 10 SECONDS | HISTOGRAM AMOUNT a OF NEXT PRECEDING FRAME | HISTOGRAM AMOUNT a' OF NEXT FOLLOWING FRAME |
| | 2 MINUTES AND 20 SECONDS | HISTOGRAM AMOUNT b OF NEXT PRECEDING FRAME | HISTOGRAM AMOUNT b' OF NEXT FOLLOWING FRAME |
| | 3 MINUTES AND 30 SECONDS | HISTOGRAM AMOUNT c OF NEXT PRECEDING FRAME | HISTOGRAM AMOUNT c' OF NEXT FOLLOWING FRAME |
| | ... | ... | ... |

FIG.37

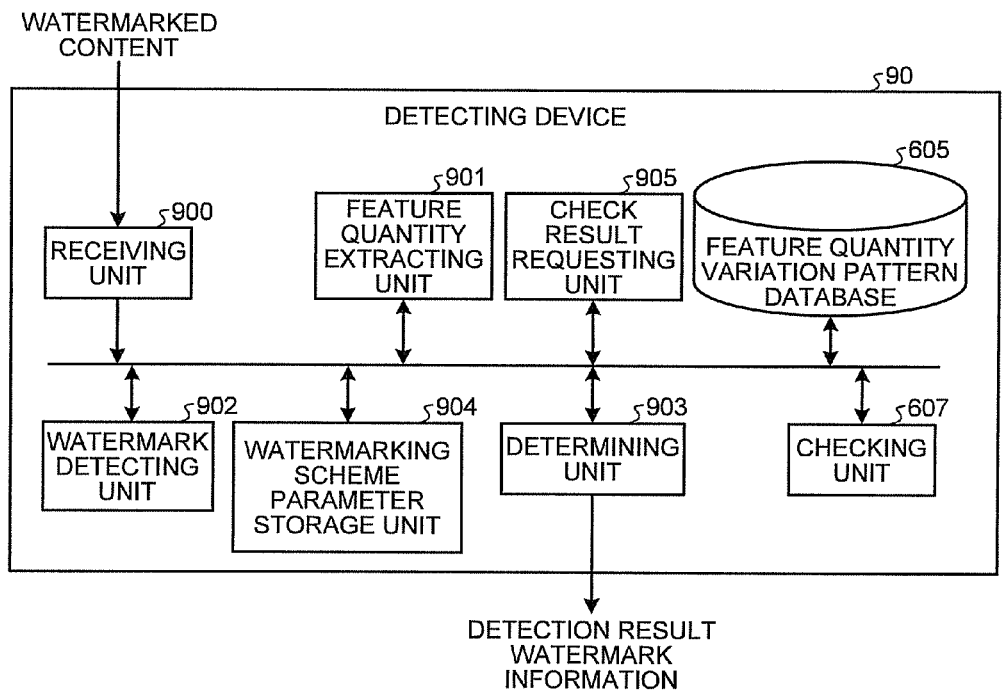

INFORMATION PROCESSING DEVICE AND COMPUTER PROGRAM PRODUCT

CROSS-REFERENCE TO RELATED APPLICATIONS

This application is based upon and claims the benefit of priority from Japanese Patent Application No. 2010-206118, filed on Sep. 14, 2010; the entire contents of which are incorporated herein by reference.

FIELD

Embodiments described herein relate generally to an information processing device and a computer program product.

BACKGROUND

In recent years, services to deliver contents such as movies and music have been provided. Users using such services pay charges to service providers for using the services and enjoy the contents. Contents may be delivered online through the Internet, terrestrial broadcasting, satellite broadcasting, cable television lines, optical lines, telephone lines, or a communication network including a combination thereof, or may be recorded on recording media such as compact disks (CD), flexible disks (FD), digital versatile disks (DVD) and blue-ray discs (BD) to be distributed offline. Some service providers encrypt contents before delivering them so as to permit only authorized users to access the contents. If decryption keys for the contents that are encrypted (encrypted contents) are issued only to authorized users, users who are not authorized and do not have the decryption keys (unauthorized users) cannot decrypt the encrypted contents. However, encryption of contents alone may not be sufficient to counter such threads as follows. For outputting a content (for example, displaying video on a display device) on the user side, a decrypted content is transmitted to an output device such as a display device. Then, a malicious user might take out the content output to the output device (for example, capturing and taking out the video that is displayed on the display device), and re-distribute the content to unauthorized users or disclose the content by uploading it onto a site on the Internet such as a video sharing site. Digital watermarking technologies are known as countermeasures against such threads.

Digital watermarking allows embedding, into contents such as audio, music, video, static images that are converted into digital data, of information such as copyright holder identification information of the contents, copyright holder identification information, content identification information, user identification information, distributor identification information, use conditions of the contents, secret information necessary for using the contents and copy control information in a state where such information cannot be recognized by human perception. For example, if user identification information is embedded as a digital watermark in a content and if the content is leaked, the user who leaked the content can be identified by detecting the user identification information embedded in the leaked content. Therefore, unauthorized users can be deterred from re-distributing contents by adopting the digital watermarking technologies. Moreover, if content identification information is embedded as a digital watermark in a content and if the content is disclosed on an Internet site such as a video sharing site, the content to be deleted therefrom can be identified by detecting the content identification information embedded in the disclosed content. If these processes are to be automatically performed to some extent, it is possible to efficiently find contents to be deleted among a huge number of contents disclosed on Internet sites and to request operators of the Internet sites to delete the contents in early stages. Therefore, contents uploaded by unauthorized users can be efficiently deleted by using the digital watermarking technologies. In addition, usage of the digital watermarking technology can improve copyright protection including usage control and copying control and can promote the secondary usage of the products.

Various techniques have been proposed for digital watermarking schemes. A scheme based on the spread spectrum technology is known as one of such techniques. There has been proposed a technology of embedding watermark information into an original image, by using a signal that has a specific frequency component and that is extracted from the image signal of the original image into which the watermark information is to be embedded. Watermark information refers to information to be embedded as a digital watermark.

If the amount of watermark information is large, the watermark information needs to be divided and be embedded into a content at respective temporal intervals. Dividing and embedding watermark information into a content at respective temporal intervals means, in a case where a symbol string "ABC" is to be embedded as watermark information, for example, such operations as: embedding "A" into an interval $\alpha$ (for example, the first one minute); embedding "B" into an interval $\beta$ (for example, the next one minute); and embedding "C" into an interval $\gamma$ (for example, the next one minute after the next). If watermark information is divided and is embedded into a content at respective temporal intervals in this manner, boundaries between the intervals have to be known for detecting the watermark information from the content in which the watermark information is embedded. This is because the beginning of a leaked content cannot be expected to be coincident with the beginning of a certain interval since a content that is re-distributed by an unauthorized user is a part of a distributed content extracted therefrom (for example, an extract of a several minutes containing a climactic scene in a content such as a movie). If an interval including the latter half of the interval $\alpha$ and the former half of the interval $\beta$ is incorrectly detected for the interval $\alpha$ and detection is made from the incorrect interval, it is likely that incorrect watermark information is detected or the detection result cannot be determined. Thus, there is an issuer that it is necessary to correctly detect from which time point to which time point in a leaked content each symbol is embedded in order to correctly detect watermark information from the leaked content.

As one solution to this problem, features of a content may be used. If the content is of video, one of the features of the content includes a scene change. A scene change is an event that a histogram variation between a previous frame and a next frame at a display time exceeds a certain threshold. A scene change point is a point where a scene change occurs. There has been proposed a technique that embeds a digital watermark in synchronization with scene changes in video so as to correctly detect watermark information even if a time lag occurs.

If the technique just mentioned above is used for dividing and embedding watermark information into a content at respective temporal intervals, the following problem occurs. The problem will be described using an example where a symbol string "ABC" is to be embedded as watermark information. For example, in a case where there are two scene change points in a content to be distributed, it is assumed that time point $t0, \ldots, t7$ each represents time (for example, time elapsed from the beginning of the content) at a boundary between intervals; time t0 corresponds to a first scene change point; and time t4 corresponds to a second scene change points. In this case, starting points of embedding "A" are determined to be coincident with the scene change points t0 and t4. It is assumed that "A" is embedded as watermark information into an interval "t1−t0" from the first scene change point t0 as the starting point to time t1; "B" is embedded as watermark information into an interval "t2−t1"; and "C" is embedded as watermark information into an interval "t3−t2". Further, "A" is embedded as watermark information into an interval "t5−t4" from the second scene change point t4 as the starting point to time t5; "B" is embedded as watermark information into an interval "t6−t5"; and "C" is embedded as watermark information into an interval "t7−t6". It is assumed here that an unauthorized user extracted a part starting from a point between time t0 and time t1 and ending at a point between time t4 and time t5 from the content; and leaked the extracted part. In this case, there is only one scene change point, which is t4, contained in the leaked part of the content. In this case, although "A" that is embedded in the interval from time t4 to time t5 can be detected, the rest of the watermark information cannot be detected correctly since information on the other intervals cannot be obtained. If it is assumed that a plurality of scene change points is present from time t0 to time t3 and that an unauthorized user extracted and leaked the content as described above, there is a plurality of scene change points contained in the leaked part of the content. In this case, it is difficult to correctly detect the whole watermark information since it is not known from which scene change point embedding of the watermark information starts. As described above, it is difficult to correctly detect watermark information if the technique mentioned above is used for dividing and embedding watermark information into a content at respective temporal intervals.

BRIEF DESCRIPTION OF THE DRAWINGS

FIG. 3 is a diagram for explaining embedding of respective components of an initial vector;
FIG. 4 is a diagram for explaining embedding of respective components of an initial vector;
FIG. 5 is a table illustrating a data structure of watermarking scheme parameters;
FIG. 6 is a table illustrating a data structure of watermarking scheme parameters;
FIG. 7 is a table illustrating a data structure of watermarking scheme parameters;
FIG. 8 is a diagram for explaining embedding of respective components of an initial vector;
FIG. 9 is a diagram illustrating a functional configuration of a detecting device;
FIG. 15 is a table illustrating a scene change point pattern;
FIG. 16 is a table illustrating a scene change point pattern;
FIG. 17 is a table illustrating a scene change point pattern;
FIG. 21 is a diagram illustrating a functional configuration of a server;
FIG. 22 is a table illustrating a scene change point pattern;
FIG. 23 is a table illustrating a scene change point pattern;
FIG. 28 is a table illustrating a data structure of watermarking scheme parameters;
FIG. 29 is a flowchart illustrating procedures performed by the client;
FIG. 32 is a table illustrating a data structure of watermarking scheme parameters according to one modified example;
FIG. 33 is a table illustrating a data structure of watermarking scheme parameters according to one modified example;
FIG. 36 is a table illustrating a scene change point pattern according to one modified example;
FIG. 37 is a diagram illustrating a functional configuration of a detecting device according to one modified example.

DETAILED DESCRIPTION

Figure 1:
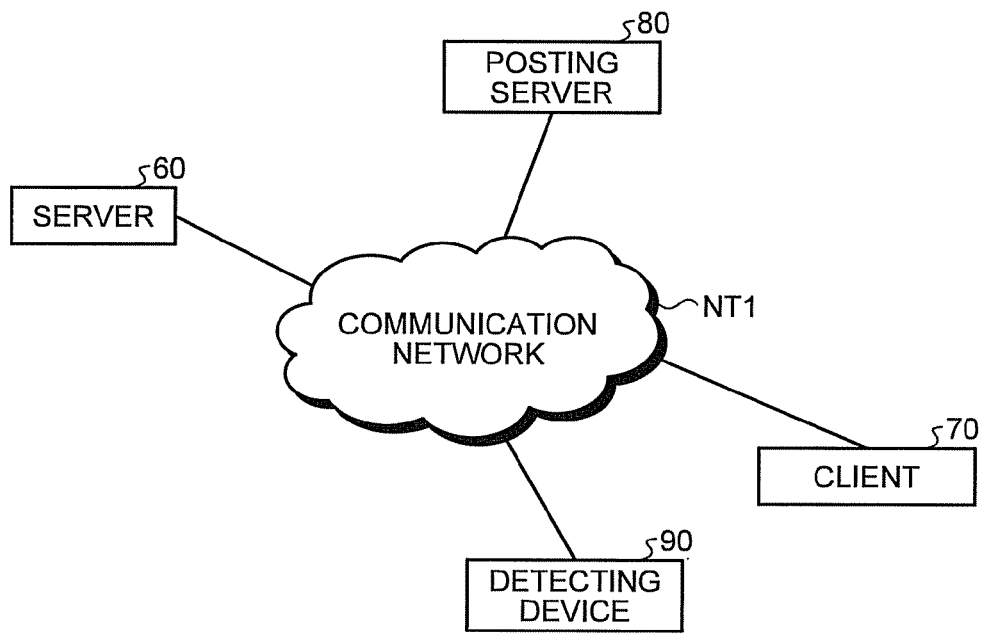
FIG. 1 is a diagram illustrating a configuration of a content distribution system according to a first embodiment.

According to an embodiment, an information processing device, includes: an extracting unit configured to extract a feature quantity of a content; a first detecting unit configured to detect a point in the content where variation of the feature quantity is a first predetermined amount or more; a second detecting unit configured to detect components of watermark information including components corresponding to respective intervals based on the point; a determining unit configured to determine a reliability of the watermark information that is detected; and a selecting unit configured to select a first watermark information from the watermark information based on a result of determination determined by the determining unit.

First Embodiment

First, a feature quantity of a content to be employed in this embodiment will be described here. A feature quantity is a value obtained by quantifying or classifying a feature of a content. Contents can be roughly classified as either images (for example, images in moving image data such as MPEG-2) or audio (for example, audio in moving image data such as MPEG-2, and audio data such as MP3). In this embodiment, an example where feature quantities of images are employed is described. Examples of the feature quantities of images include luminance histogram, edge histogram, direction histogram, color histogram, luminance gradient direction co-occurrence histogram, and so on. The feature quantities need not necessarily be converted into histograms; and luminance feature quantity, edge feature quantity, direction feature quantity, and color feature quantity (which are not converted into histograms) may be used. In addition, a local feature quantity may be used. Known local feature quantities include SIFT (Scale-invariant feature transform) and SURF (Speeded Up Robust Features).

A feature quantity may also be a luminance ratio of a plurality of regions into which one frame of an image is divided. For example, a luminance ratio of two regions, obtained by dividing a frame into a left region and a right region, may be used as a feature quantity. Information on a frequency such as a horizontal frequency, a vertical frequency, or a two-dimensional space frequency of an image may also be used as a feature quantity. A coefficient obtained by applying the fast Fourier transform or the discrete cosine transform may also be used as a feature quantity.

Moreover, frames of an MPEG image may be classified, and a type to which a frame belongs may be used as a feature quantity of the frame. A method used to classify the frames may be a method of classifying frames based on picture types (I-picture, P-picture, and B-picture) (for example, a method of classifying frames into two groups based on whether a picture type of a frame is I- or P-picture, or B-picture); a method of classifying frames based on feature quantities (for example, average luminance) of the frames (for example, a method of calculating average luminance for each frame and classifying the frames based on the level of the average luminance (any number of levels may be set)); or a method appropriately combining these methods.

Examples where a feature quantity is determined in units of a frame of an image are given above. However, a feature quantity may alternatively be determined in units of a field, in units of a plurality of frames, or in units of a plurality of fields.

Next, a configuration of a content distribution system according to this embodiment will be described referring to FIG. 1. The content distribution system includes a server 60, a client 70 that is a user terminal, a posting server 80 and a detecting device 90, which are connected through a communication network NT1. Examples of the communication network NT1 include terrestrial broadcasting, satellite broadcasting, a cable television network, an optical network, a telephone network, a local area network (LAN), an intranet, an Ethernet (registered trademark), the Internet, and a combination thereof. Although only one server 60, one client 70, one posting server 80 and one detecting device 90 are illustrated in FIG. 1, there may be more than one of them.

The server 60 delivers a content to the client 70. Such a content may be delivered online through the communication network NT1, or may be recorded on a recording medium such as a compact disk (CD), a flexible disk (FD), a digital versatile disk (DVD) and a blue-ray disc (BD) and delivered offline. The posting server 80 is a server that provides a posting site such as YouTube (registered trademark), and all or some of contents thereon are uploaded through the client 70. The detecting device 90 detects a content that a right holder thereof does not permit to upload among contents uploaded onto the posting server 80.

Next, hardware configurations of devices including the server 60, the client 70, the posting server 80 and the detecting device 90 will be described. Each of the devices includes a controlling unit such as a central processing unit (CPU) configured to control the entire device, a main storage unit such as a read only memory (ROM) and a random access memory (RAM) configured to store various data and various programs, an auxiliary storage unit such as a hard disk drive (HDD) and a compact disk (CD) drive configured to store various data and various programs, and a bus that connects these units, which is a hardware configuration using a common computer system. In addition, a display device configured to display information, an input device such as a keyboard and a mouse configured to receive instructions input by a user, and a communication interface (I/F) configured to control communication with an external device are connected to each of the devices through wired or wireless connections.

Figure 2:
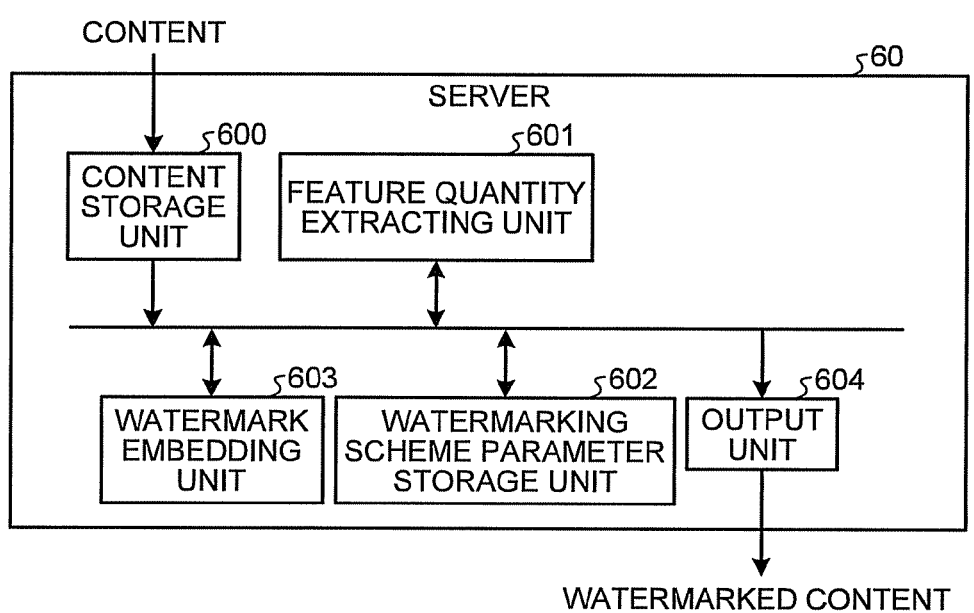
FIG. 2 is a diagram illustrating a functional configuration of a server.

Next, various functions implemented by the server 60 will be described. FIG. 2 is a diagram illustrating a functional configuration of the server 60. The server 60 includes a content storage unit 600, a feature quantity extracting unit 601, a watermarking scheme parameter storage unit 602, a watermark embedding unit 603, and an output unit 604. Functions of the feature quantity extracting unit 601 and the watermark embedding unit 603 are implemented by executing various programs stored in the main storage unit and the auxiliary storage unit by the CPU of the server 60. The functions of the output unit 604 are implemented by the communication I/F of the server 60 and by executing various programs stored in the main storage unit and the auxiliary storage unit by the CPU of the server 60. The content storage unit 600 and the watermarking scheme parameter storage unit 602 are storage areas reserved in the auxiliary storage unit, for example, of the server 60.

The content storage unit 600 stores a content in association with content identification information for identifying the content. The feature quantity extracting unit 601 extracts a feature quantity of a content. In this embodiment, a scene change point is employed as the feature quantity of a content. A method for detecting a scene change may be a method disclosed in JP-A 2010-141591 (KOKAI), for example.

The feature quantity extracting unit 601 may extract a feature quantity from some of images constituting a content instead of all the images constituting the content. Moreover, the feature quantity extracting unit 601 may extract or need not extract feature quantities for all images constituting a content. For example, the feature quantity extracting unit 601 may extract a feature quantity of an image belonging to a certain interval, without extracting a feature quantity of an image belonging to the next interval, and extract a feature quantity of an image belonging to the next interval after the next. In this manner, processing loads for extracting feature quantities can be reduced.

The watermark embedding unit 603 embeds watermark information using watermarking scheme parameters stored in the watermarking scheme parameter storage unit 602 based on a change in the feature quantity extracted by the feature quantity extracting unit 601.

First, watermark information will be described here. Watermark information employed in this embodiment includes three types of watermark information, i.e., first watermark information, second watermark information and third watermark information. The first watermark information is associated uniquely with a content. Examples thereof include a combination of some of genre identification information for identifying the genre of a content, right holder identification information for identifying a right holder of a content, author identification information for identifying an author of a content, photographer identification information for identifying a photographer of an image in a content, editor identification information for identifying an editor of a content, performer identification information for identifying a performer of a content, related content identification information for identifying a related content of a content, and issuer identification information of each identification information item, content identification information, and a uniform resource locator (URL) of a website providing such information.

The second watermark information may be the same for different contents or may be different for identical contents. Examples thereof include server identification information for identifying the server 60 that provides a content, service identification information for identifying a delivery service used, genre identification information, right holder identification information, author identification information, photographer identification information, editor identification information, performer identification information, related content identification information, issuer identification information of each identification information item, right holder identification information for identifying a right holder of a content, content identification information for identifying a content (for example, a commercial message) that is added separately from a main content, re-embedding scheme identification information for identifying a re-embedding scheme of a digital watermark (re-embedding will be described in a fourth embodiment), use condition information on use conditions of a content, billing information on a price of a content and billing to a client connecting to a server that performs a billing process, encryption key information, a URL of a website providing such information, and a URL of a website or an advertising website that sells related products of a content. The use conditions are conditions imposed on the use of a content. Examples of the use condition information on use conditions of a content include information on a purpose of use (such as a commercial, educational, or public), a type of use (such as streaming or downloading), a reproduction control (such as a period during which reproduction is permitted, an expiration date of reproduction or the number of times reproduction is permitted), a copy control, an output control, and a re-distribution range.

The third watermark information is information specific to the client 70 that use a content or information set for each user. Examples thereof include client identification information for identifying the client 70, group identification information for identifying a group to which the client 70 belongs, user attribute information (such as an educational institution, a company, or a general user), and use condition information on use conditions of a content. The client identification information may be any information as long as it can identify each client 70. Examples thereof include a client ID (such as a media access control (MAC) address, an IP address or an e-mail address of the device), a public key assigned to the client 70, a public key certificate, and a subscriber ID for a paid delivery service.

In this embodiment, an example in which the content identification information is used as the watermark information will be described. However, the watermark information is not limited thereto, and any of the first watermark information, the second watermark information, and the third watermark information, or a combination of any of these may be used as the watermark information. If the third watermark information is included in the watermark information, the server 60 that provides a content may embed the third watermark information into a content for each client 70 that the user uses; or the client 70 may embed the third watermark information into a content as in a third embodiment that will be described later. This can similarly be applied to other embodiments or modified examples that will be described later.

An encoded result of these three types of watermark information is referred to as an initial vector (WM10, WM20, ..., WMN0). Each component WMi0 ($1 \leq i \leq N$) of the initial vector may be one bit representing "0" or "1", a bit string including a plurality of bits, one symbol representing three or more values, or a symbol string including a plurality of symbols. The watermark embedding unit 603 uses each component WMi0 of such an initial vector as watermark information to be embedded into each interval of a content.

A manner in which the watermark embedding unit 603 divides a content into intervals into which the watermark information is to be embedded will be described here taking a case where the initial vector is (A, B, C) as an example. As illustrated in FIG. 3, the watermark embedding unit 603 embeds the initial vector repeatedly in such a manner that "A" is embedded into each frame that are present within an interval from time t0 to time t1, "B" is embedded into each frame that are present within an interval from time t1 to time t2, "C" is embedded into each frame that are present within an interval from time t2 to time t3, and similarly, "A" is embedded into each frame within an interval from time t3 to time t4, "B" is embedded into each frame within an interval from time t4 to time t5, and "C" is embedded into each frame within an interval from time t5 to time t6. In this case, the following equations may be satisfied: "t1−t0=t4−t3, t2−t1=t5−t4, and t3−t2=t6−t5". As illustrated in FIG. 4, there may be an interval into which no digital watermark is embedded between an interval into which a component of the initial vector is embedded (referred to as an embedded interval) and an interval into which a next component is embedded. In the case of FIG. 4, the following equations may be satisfied: "t9−t8=t15−t14, t10−t9=t16−t15, t11−t10=t17−t16, t12−t11=t18−t17, t13−t12=t19−t18, t14−t13=t20−t19". Moreover, although t0, ..., t20 represent time in the example above, ti (i=1, 2, 3, ...) may be a frame number or a field number.

If it takes a time T or longer to detect one component at the detecting device 90, the embedded interval for each component may be set to be shorter than T. For example, in FIG. 3, the following inequality expressions may be satisfied: "(t1−t0)+(t4−t3)≥T, (t2−t1)+(t5−t4)≥T, and (t3−t2)+(t6−t5)≥T. For example, if noise is added locally, detection of a digital watermark from a plurality of separate intervals is less affected by the noise than detection of digital watermark from successive intervals. Thus, the accuracy of detecting a digital watermark can be improved in this manner.

In this embodiment, the watermark embedding unit 603 determines an interval into which each component of the initial vector is embedded and a blank interval (blank interval) into which no component of the initial vector is embedded by using watermarking scheme parameters stored in the watermarking scheme parameter storage unit 602.

The watermarking scheme parameters will be described here. The watermarking scheme parameter storage unit 602 stores a watermarking scheme parameter in association with content identification information. A watermarking scheme parameter specifies a manner in which a digital watermark is embedded, and indicates, for each content identification information, an embedding strength of the digital watermark, embedded intervals for embedding the digital watermark and the initial vector. The reason why the embedding strength of a digital watermark is specified is as follows. In general, the detection accuracy for detecting a digital watermark is improved as the embedding strength of the digital watermark is stronger. However, if the embedding strength of a digital watermark is too high, the digital watermark can be undesirably perceived by a human, and the quality of a content in which the digital watermark is embedded is deteriorated in some cases. For example, if the content is video such as moving images and static images, the image quality may be deteriorated to such an extent that the user cannot pleasantly looks at. Accordingly, the embedding strength of a watermark is determined considering both the detecting accuracy and the perceptibility of the digital watermark. In addition, while a digital watermark is relatively less perceptible in a moving image changing much even if it is strongly embedded thereinto, a digital watermark can be easily perceived in a static image by the user if it is embedded thereinto at equal strength, for example. Therefore, the embedding strength of a watermark may be changed within one single content.

FIG. 5 is a table illustrating a data structure of watermarking scheme parameters. In the watermarking scheme parameters illustrated in FIG. 5, it is specified that an initial vector (A, B, C) is to be embedded into a content whose content identification information is "1234" at an embedded interval of one minute for each component of the initial vector at an embedding strength of 45 dB in the SN ratio (signal-to-noise ratio). FIG. 5 illustrates that an embedded interval "t1–t0", an embedded interval "t2–t1" and an embedded interval "t3–t2" illustrated in FIG. 5 correspond to those illustrated in FIG. 3, for example; that each of the embedded intervals is one minute long; and that the components to be embedded sequentially in the order of the embedded intervals are "A", "B" and "C". The interval "t4–t3" in FIG. 3 is equal to the embedded interval "t1–t0"; the interval "t5–t4" in FIG. 3 is equal to the embedded interval "t2–t1"; and the interval "t6–t5" in FIG. 3 is equal to the embedded interval "t3–t2".

It is assumed in this embodiment that the embedding strength of a digital watermark and the embedded intervals of a digital watermark are fixed for the content distribution system. In this case, the values of the embedding strength of a digital watermark and the embedded intervals of a digital watermark may be stored in the auxiliary storage unit, for example, in common to the contents; and the watermarking scheme parameters may indicate only the initial vector for each content identification information as illustrated in FIG. 6, for example. It is also assumed that the number of components included in the initial vector is fixed for the content distribution system.

The watermark embedding unit 603 may divide a frame of an image constituting a content into a plurality of regions and embed each component of the initial vector into each of the regions obtained by the division. In this case, points (referred to as starting points of embedding) from which embedding is started in the respective regions obtained by the division may be the same as or different from one another. Specifically, in a case where the initial vector is (A, B, C, D, E, F), a frame is divided into two regions of a left region and a right region, three components "ABC" of the initial vector are embedded into the left region, and the remaining three components "DEF" of the initial vector are embedded into the right region, for example, a temporal starting point of embedding the component "A" may be the same as or different from a temporal starting point of embedding the component "D". In this manner, the amount of information that can be embedded in one content can be increased.

In this case, the watermarking scheme parameters may include information indicating that a frame of an image constituting a content is to be divided into a plurality of regions; and watermark information is to be embedded into each of the regions obtained by the division. FIG. 7 is a table illustrating watermarking scheme parameters in a case where the initial vector is (A, B, C, D, E, and F); a frame is divided into two regions of a left region and a right region; a component string "ABC" is embedded into the left region; and a component string "DEF" is embedded into the right region. t'i ($0 \leq i \leq 3$) in FIG. 7 corresponds to t'i in FIG. 8. In FIG. 7, an example, where the following equations are satisfied, is illustrated: "t1–t0=t'1–t'0, t2–t1=t'2–t'1, and t3–t2=t'3–t'2. However, the parameters are not limited thereto and may be "t1–t0≠t'1–t'0" and may be "t1–t0·t2–t1".

The watermark embedding unit 603 embeds the above-described initial vector into a content using the watermarking scheme parameters as described above stored in the watermarking scheme parameter storage unit 602. A method for embedding a digital watermark may be a method disclosed in JP-A 2006-229857 (KOKAI), for example.

The method disclosed in JP-A 2006-229857 (KOKAI) is a method for embedding a digital watermark in an image. However, the method is not limited thereto and may be a method for embedding a digital watermark in audio. Alternatively, a method for embedding a digital watermark into an encoded content or a method for embedding a digital watermark into a baseband signal may be used. Still alternatively, used may be a method for embedding a digital watermark in which images (original images) constituting a content or audio (original audio) constituting a content are used in detection of the digital watermark or a method for embedding a digital watermark in which such images or audio are not used in detection of the digital watermark.

As a result, images representing components of the initial vector are combined with the frames constituting a content, whereby frames in which a digital watermark is embedded are generated. The description refers back to FIG. 2. The output unit 604 outputs a content into which the watermark embedding unit 603 embedded the initial vector; and transmits the content to the client 70.

Next, various functions implemented by the detecting device 90 will be described. FIG. 9 is a diagram illustrating a functional configuration of the detecting device 90. The detecting device 90 includes a receiving unit 900, a feature quantity extracting unit 901, a watermark detecting unit 902, and a determining unit 903. The functions of the receiving unit 900 are implemented by the communication I/F of the detecting device 90 and by executing various programs stored in the main storage unit and the auxiliary storage unit by the CPU of the detecting device 90. Functions of the feature quantity extracting unit 901, the watermark detecting unit 902 and the determining unit 903 are implemented by executing various programs stored in the main storage unit and the auxiliary storage unit by the CPU of the detecting device 90.

The receiving unit 900 receives the whole or a part of a content which is uploaded onto a posting site of the posting server 80 and in which a digital watermark is embedded (referred to as a detection target content). The feature quantity extracting unit 901 extracts a feature quantity of a detection target content received by the receiving unit 900. A method in which the feature quantity extracting unit 901 extracts a feature quantity is similar to the method in which the feature quantity extracting unit 601 of the server 60 as described above extracts a feature quantity. Here, the feature quantity extracting unit 901 detects a scene change point as a change of the feature quantity from the detection target content. The watermark detecting unit 902 detects a digital watermark from the detection target content received by the receiving unit 900 using the scene change point detected by the feature quantity extracting unit 901 as a starting point.

The determining unit 903 calculates a reliability of each digital watermark detected by the watermark detecting unit 902 using scene change points as starting points. The reliability of a digital watermark is the probability of the detection of a digital watermark. For example, if methods disclosed in JP-A 2005-86349 (KOKAI) are used as methods for embedding and detecting a digital watermark, the determining unit 903 calculates the reliability using a value of a detection level calculated based on a magnitude of correlation between a frame constituting a detection target content in which a digital watermark is embedded and a frame of the image in which a digital watermark is embedded. The reliability is higher as the value of the detection level is larger. Here, the embedding strength of a digital watermark and the embedded intervals of a digital watermark are fixed for the content distribution system as described above. Accordingly, the determining unit 903 can determine an interval (embedded interval) into which each component is embedded; as long as a point (for example, a point corresponding to time t0, t3 or t6 in FIG. 3), from which the initial vector is started to be embedded in a detection target content, can be determined. A component, embedded from a scene change point as a starting point, can be any of the components $WM_{i0}$ of the initial vector. Accordingly, if the embedded intervals of $WM_{i0}$ are not equal for the respective components, the reliability of a digital watermark in each embedded interval is calculated.

Then, the determining unit 903 decodes the initial vector detected in an interval for a predetermined length Q from a scene change point, which corresponds to a reliability of a digital watermark, as a starting point to obtain the watermark information based on the reliability of the digital watermark and output the obtained watermark information. An interval for a predetermined length Q from a starting point corresponds to an embedded interval. The length Q is preset based on the embedded intervals that are fixed for the content distribution system.

Figure 10:
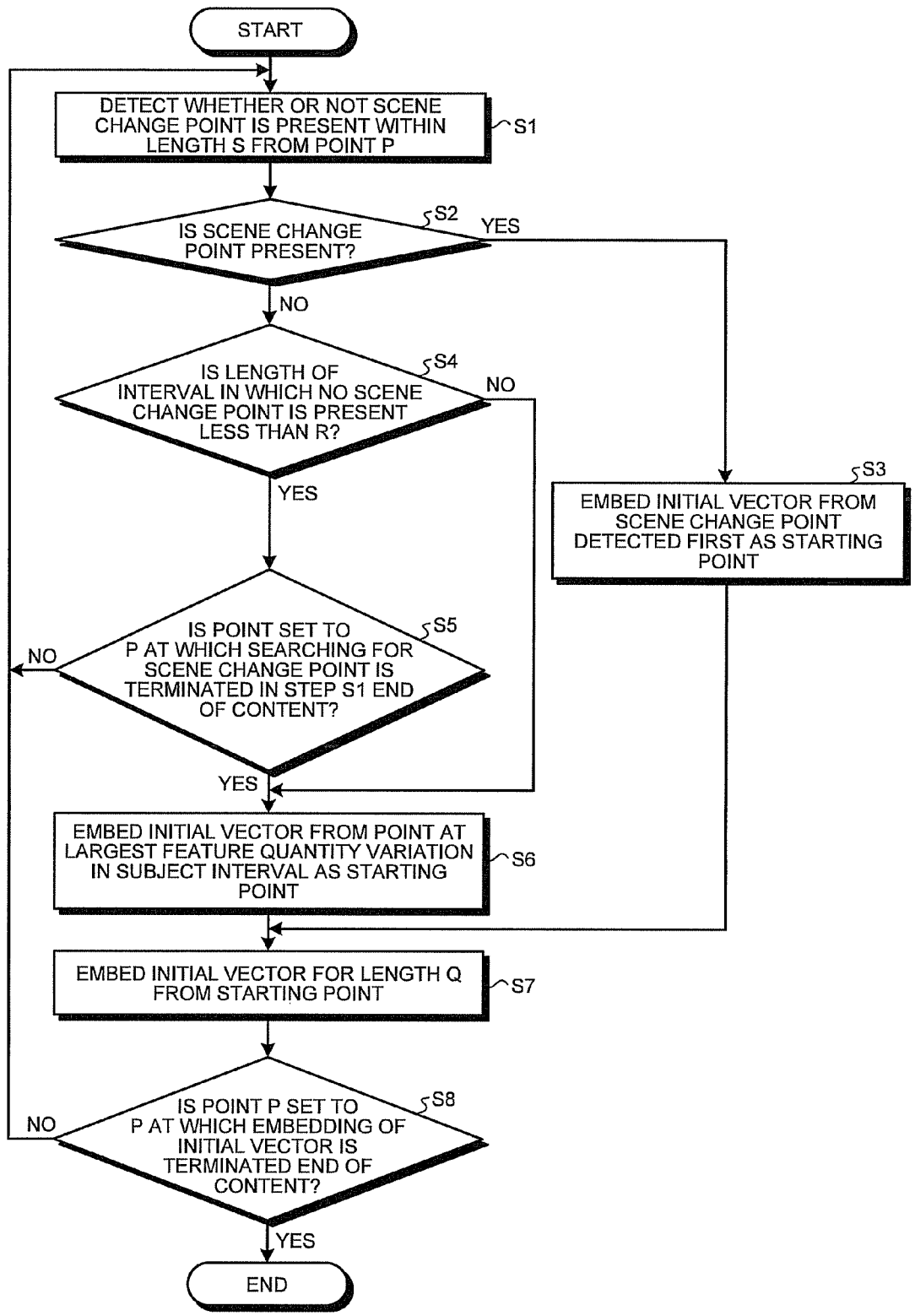
FIG. 10 is a flowchart illustrating procedures performed by the server.

Next, procedures of processes performed in the content distribution system according to this embodiment will be described. First, procedures of watermark embedding and content delivery processes performed by the server 60 will be described referring to FIG. 10. The server 60 reads out a content into which a digital watermark is to be embedded from the content storage unit 600. Here, the server 60 sets in advance a value of a length S of a window used for searching for a scene change point (for example, S is set to one minute). The server 60 searches whether or not a scene change point is present within the window of the length S from a point P (P is the beginning of the content in the initial state) of the content (for example, within one minute from the beginning of the content) by the functions of the feature quantity extracting unit 601 (step S1). If, for example, the method disclosed in JP-A 2010-141591 (KOKAI) is used as the method for detecting a scene change, the server 60 sets in advance a threshold of a histogram variation for determining a scene change point, and determines that a scene change occurs if a detected histogram variation exceeds the threshold. A point, where a scene change occurs, is to be a scene change point.

If a scene change point is present (YES in step S2), the server 60 embeds an initial vector from the scene change point that is detected first within the length S as the starting point (step S3). If, for example, the method disclosed in JP-A 2010-141591 (KOKAI) is used as the method for detecting a scene change in step S1, the server 60 embeds the initial vector from a scene change point with the largest histogram variation among scene change points detected within the window size S as the starting point. Then, the process proceeds to step S7. On the other hand, if no scene change point is present (NO in step S2), the server 60 determines whether or not a length of interval in which no scene change point is present is less than a threshold R (step S4). If the determination result is positive (YES in step S4), the server 60 sets a point at which searching for a scene change point is terminated in step S1 to a new point P and determines whether or not the point P is an end of the content (step S5). If the determination result is negative (NO in step S5), the process returns to step S1. If the determination result is positive (YES in step S5), the process proceeds to step S6. On the other hand, if the server 60 determines that the length of the interval in which no scene change point is present is equal to or longer than the threshold R in step S4 (NO in step S4), the process proceeds to step S6.

In step S6, the initial vector is embedded from a point at which the feature quantity variation is the largest within the interval as the starting point. If, for example, the method disclosed in JP-A 2010-141591 (KOKAI) is used as the method for detecting a scene change, the server 60 embeds the initial vector from a point at which the histogram variation is the largest as a starting point in step S6. Then, the process proceeds to step S7.

In step S7, the server 60 embeds the initial vector in an interval for the above-mentioned length Q from the starting point determined in step S3 or step S6. At this time, if a component of the initial vector that is previously embedded is $WM_{i0}$, the server 60 starts embedding from $WM_{i+1}0$. In the example of FIG. 3, a component or components that are embedded in the previous step S6 may be "A", "ABC", or "ABCAB" depending on the value of Q. In such cases, a component or components to be embedded in the current step S6 are "B", "ABC", or "CABCA", respectively. In the last case, the server 60 may continue to embed "ABCAB" instead of "CABCA". Then, the server 60 sets a point where embedding of the initial vector is terminated to a new point P and determines whether or not the point P is the end of the content (step S8). If the point P is not the end of the content (NO in step S8), the process returns to step S1. If the point P is the end of the content (YES in step S8), the server 60 terminates the process. After termination of the process, the server 60 transmits the content into which a digital watermark is embedded as a result of embedding of the initial vector to the client 70.

After receiving a content transmitted from the server 60, the client 70 uploads the whole or a part of the content onto a posting site by transmitting it to the posting server 80. The detecting device 90 performs a process of receiving the whole or the part of the content (detection target content) that is uploaded onto the posting site in this manner from the posting server 80 and a process of detecting the digital watermark therefrom. Procedures of this process will be described referring to FIG. 11. First, the detecting device 90 sets in advance a value of a length S' of a window used for searching for a scene change point (for example, S' is set to one minute). The value of S' may be the same as or different from the value, of S set by the server 60 in the watermark embedding and content delivery processes described with reference to FIG. 10. Then, the detecting device 90 searches the detection target content received from the posting server 80 whether or not a scene change point is present within the window of the length S' from a point P (P is the beginning of the detection target content in the initial state) of the detection target content (for example, within one minute from the beginning of the content) by the functions of the feature quantity extracting unit 901 (step S10).

If a scene change point is present (YES in step S11), the detecting device 90 selects k scene change points (step S14). k is a natural number and may be predetermined or dynamically determined. For example, k may be determined to a value proportional to S' or may be determined relative to the computational capacity of the detecting device 90 or the amount of memory of the main storage unit and the auxiliary storage unit. If the number of scene change points detected as a result of searching in step S10 is less than k, k in step S14 may be read as the number of detected scene change points. If the number of scene change points detected as a result of searching in step S10 is more than k, k in step S14 may be read as the total number of detected scene change points or k scene change points may be selected from the detected scene change points in descending order of the feature quantity variation. After step S14, the process proceeds to step S15.

On the other hand, if no scene change point is present (NO in step S11), the detecting device 90 determines whether or not the length of an interval in which no scene change point is present is shorter than the predetermined threshold R (step S12). If the determination result is positive (YES in step S12), the detecting device 90 sets a point where searching for a scene change point in step S10 is terminated as a new point P and determines whether or not the point P is the end of the content (step S13). If the determination result is negative (NO in step S13), the process returns to step S10. If the determination result is positive (YES in step S13), the process proceeds to step S14. If the detecting device 90 determines that the length of the interval in which no scene change point is present is equal to or longer than the threshold R in step S12 (NO in step S12), the process proceeds to step S14. In step S14, the detecting device 90 selects k scene change points in descending order of the feature quantity variation within the interval as the feature quantity variation points. If the method disclosed in JP-A 2010-141591 (KOKAI), for example, is used as the method for detecting a scene change, the detecting device 90 selects k scene change points in descending order of the histogram variation in step S14. If the number of significant feature quantity variation points is less than k, for example, k in step S14 may be read as the number of significant feature quantity variation points. After step S14, the process proceeds to step S15.

In step S15, the detecting device 90 detects the digital watermark from each of k scene change points or feature quantity variation points selected in step S14 as the starting point, and calculates the reliability of the digital watermark by the functions of the watermark detecting unit 902. Next, the detecting device 90 selects the highest reliability of the digital watermark; sets the scene change point or the feature quantity variation point corresponding thereto as a candidate; and detects the components of the initial vector within an interval for the length Q from the scene change point or the feature quantity variation point as the starting point by the functions of the determining unit 903 (step S16). Then, the detecting device 90 sets a point where the process of step S16 is terminated as a point P, and determines whether or not the point P is the end of the content (step S17). If the point P is not the end of the content (NO in step S17), the process returns to step S10. If the point P is the end of the content (YES in step S17), the detecting device 90 decodes the initial vector detected in step S16 to reconstruct the watermark information, and outputs the watermark information (step S18). As a result, in this embodiment, the content identification information is reconstructed and output as the watermark information.

Figure 12:
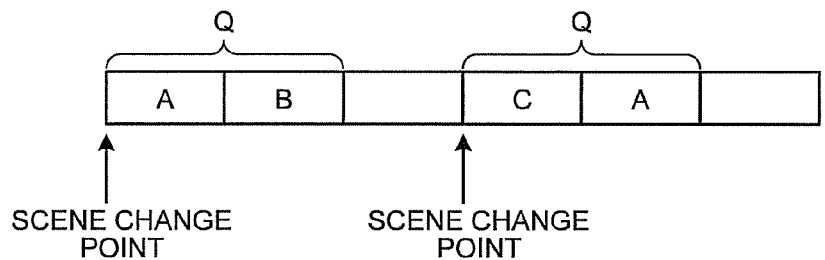
FIG. 12 is a diagram for explaining detection of respective components of an initial vector.
Figure 13:
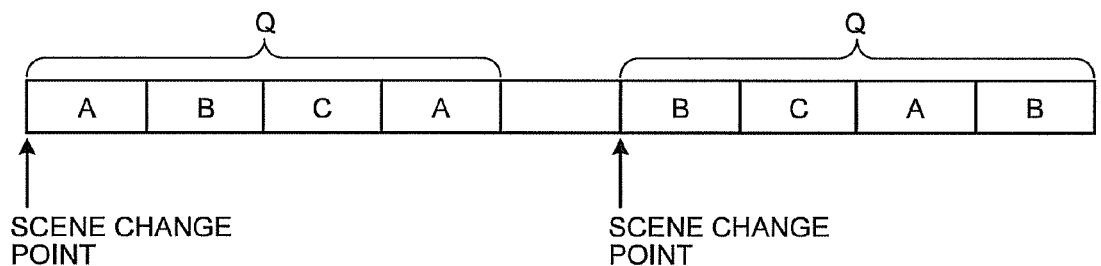
FIG. 13 is a diagram for explaining detection of respective components of an initial vector.

Here, a specific example of the process in step S16 will be described. As described above, some of the components of the initial vector may be included in one interval of the length Q as illustrated in FIG. 12; or all the components of the initial vector may be included in one interval of the length Q as illustrated in FIG. 13. In this embodiment, since the number of components included in the initial vector is fixed for the content distribution system, the detecting device 90 uses the number to determine whether or not the components included in the interval of the length Q is all the components of the initial vector. In this process, if the detecting device 90 determines that the components included in the interval of the length Q is a part of the initial vector as illustrated in FIG. 12, the detecting device 90 detects "AB" at the first time when step S16 is performed and detects "CA" at the second time when step S16 is performed. As a result, all the components (A, B, C) included in the initial vector are detected.

If the detecting device 90 determines that the components included in the interval of the length Q are all the components of the initial vector as illustrated in FIG. 13, the detecting device 90 detects "ABCA" at the first time of step S16. As a result, all the components (A, B, C) included in the initial vector are detected. In this case, the detecting device 90 need not perform the second time of step S16. In other words, the detecting device 90 may skip step S17 and perform the process of step S18 after step S16. Alternatively, the detecting device 90 may repeat the process of step S16 without skipping step S17. If the detecting device 90 repeats the process of step S16, it is possible to reduce the impact of the detection error of the initial vector. Thus, the detection accuracy can be improved.

In addition, it is described above that the embedded interval for each component may be set to be shorter than T if it takes the time T or longer to detect one component correctly. In this case, if the detecting device 90 repeats the process of step S16, it is possible to increase the time for detecting each component. Thus, the detection accuracy of each component of the initial vector can be improved. If the detecting device 90 stores the value of T, it determines whether or not the time for detecting each component is T or longer in step S16. If the detecting device 90 determines that the time for detecting each component is T or longer, it may skip step S17 and perform the process of step S18. If the detecting device 90 determines that the time for detecting each component is not T or longer, it may repeat the process of step S16 without skipping step S17.

As described above, according to this embodiment, the interval, into which each component of the initial vector is to be embedded, is determined based on the temporal variation of the feature quantity. As a result, in detecting the digital watermark from the detection target content, candidates of intervals in which the components are embedded are narrowed down based on the feature quantity variation in the detection target content; and the candidates are further narrowed down based on the reliability of watermark information detected from the narrowed down candidates of intervals to obtain a final detection result. In other words, by setting points whose change of feature quantity variation of the content is large as starting points that start the embedding of the components of the initial vector, the detecting device 90 can correctly detect the watermark information from the content even when the server 60 has divided and embedded the watermark information into the content at respective temporal intervals. Moreover, since the starting points for embedding the components of the initial vector are determined based on the reliability of the digital watermark, it is not necessary to store a feature quantity variation pattern such as a scene change point pattern, which will be described later, in the server 60. Thus, it is possible to reduce the amount of memory such as the HDD, and eliminate the necessity that the detecting device 90 inquires of the server 60 the feature quantity variation pattern.

Moreover, the server 60 can adaptively adjust the embedding strength and the embedding intervals of the digital watermark when embedding the digital watermark by using predetermined watermarking scheme parameters. Accordingly, it is possible to make the digital watermark less perceptible or improve the detection accuracy.

Second Embodiment

Next, a second embodiment of the information processing device and the computer program product will be described. Parts that are the same as those in the first embodiment described above will be described using the same reference numerals or description thereof will not be repeated.

Figure 14:
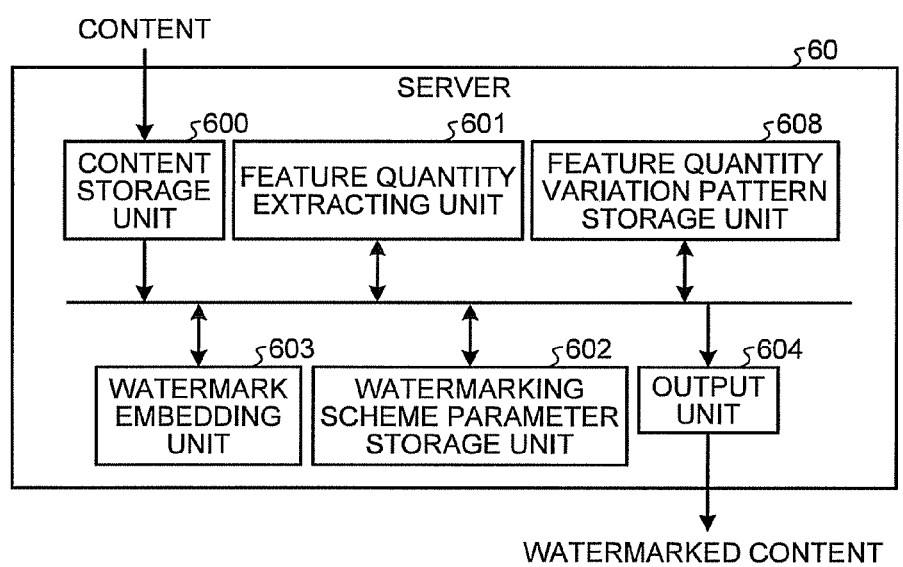
FIG. 14 is a diagram illustrating a functional configuration of a server according to a second embodiment.

In the first embodiment described above, the server 60 searches a content into which a digital watermark is to be embedded whether or not a scene change point is present for every length S of a window. In this embodiment, on the other hand, a server 60 searches in advance whether or not a scene change point is present for the whole content. FIG. 14 is a diagram illustrating a functional configuration of the server 60 according to this embodiment. The server 60 according to this embodiment further includes a feature quantity variation pattern storage unit 608 in addition to the configuration illustrated in FIG. 2. The feature quantity variation pattern storage unit 608 stores a scene change point pattern as a feature quantity variation pattern showing points where feature quantity variations extracted by the feature quantity extracting unit 601 are present within a content. Points within a content are temporal points, for example, and each corresponds to a time from the beginning of the content when the beginning of the content is set to 0 second.

A scene change point pattern is information indicating temporal points where scene change points are present within a content. FIG. 15 is a table illustrating a scene change point pattern. The scene change point pattern of FIG. 15 illustrates that scene change points are present at 10 seconds, 2 minutes and 20 seconds, 3 minutes and 30 seconds, . . . from the beginning of a content. Alternatively, a scene change point pattern may show intervals between scene change points. If the scene change point pattern illustrated in FIG. 15 is illustrated as intervals between scene change points, it will be as illustrated as in the table of FIG. 16. FIG. 17 is a table illustrating a scene change point pattern when a frame of an image constituting a content is divided into four regions of: an upper-left region, a lower-left region, an upper-right region, and a lower-right region; and the watermark information is embedded into each of the regions. As described above, even when a frame is divided into a plurality of regions and the initial vector is embedded into each of the regions, detection of a scene change point may be performed in common for the whole or a part of the frame; and the starting points of embedding may be the same in the respective regions.

Figures 18, 19, 20:
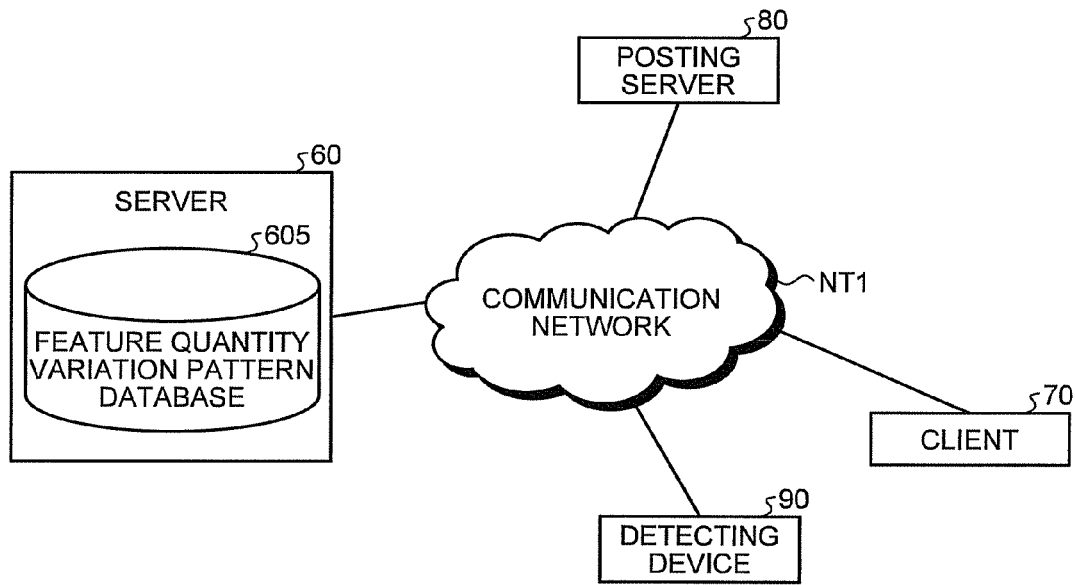
FIG. 18 is a table illustrating a scene change point pattern.
FIG. 19 is a table illustrating a data structure of watermarking scheme parameters.
FIG. 20 is a diagram illustrating a configuration of a content distribution system according to a third embodiment.

FIG. 18 is a table illustrating a scene change point pattern when a frame of an image constituting a content is divided into four regions of an upper-left region, a lower-left region, an upper-right region and a lower-right region; the watermark information is embedded into each of the regions obtained by the division; and detection of a scene change point is performed in common for the whole or a part of the frame. While FIG. 17 illustrates an example in which detection of a scene change point is performed separately for each region, FIG. 18 illustrates an example in which detection of a scene change point is performed on the whole frame, that is, in common for the respective regions and the scene change points are illustrated as intervals between scene change points (scene change point intervals). When detection of a scene change point is performed in common for a part of or the whole frame, a screen may be divided into a plurality of parts; a frame of an image constituting a content may be divided into a plurality of regions; and information indicating that watermark information is to be embedded into the respective regions obtained by the division may be included in the scene change point pattern or in the watermarking scheme parameter. For example, while the scene change point pattern illustrated in FIG. 18 includes information indicating that a frame of an image constituting a content is divided into four regions of an upper-left region, a lower-left region, an upper-right region and a lower-right region and that the watermark information is to be embedded into the regions; the information may be included in watermarking scheme parameters as illustrated in FIG. 19 instead of being included in the scene change point pattern.

The watermark embedding unit 603 embeds the initial vector into a content by using the watermarking scheme parameters stored in the watermarking scheme parameter storage unit 602 based on the scene change point pattern as described above.

Next, procedures of a process of detecting a digital watermark from a detection target content by the detecting device 90 according to this embodiment will be described. In the first embodiment, the detecting device 90 searches a scene change point in steps S10 to S13, and selects k scene change points or feature quantity variation points in step S14 of FIG. 11. In this embodiment, however, the detecting device 90 determines a scene change point present in a detection target content by using a scene change point pattern stored in association with content identification information of the detection target content in the feature quantity variation pattern storage unit 608, and then performs the processes in steps S15 to S18 instead of performing the processes in steps S10 to S13.

With the configuration described above, points where feature quantity variations of a content are large are set to be starting points from which embedding the respective components of the initial vector starts. Accordingly, even when the server 60 divides and embeds the watermark information into a content at respective temporal intervals, the detecting device 90 can correctly detect the watermark information from the content.

Third Embodiment

Next, a third embodiment of the information processing device and the computer program product will be described. Parts that are the same as those in the first embodiment or the second embodiment described above will be described using the same reference numerals or description thereof will not be repeated.

In this embodiment, a server 60 stores a scene change point pattern for a content stored in a content storage unit 600 in advance. A detecting device 90 identifies a content corresponding to a detection target content among contents stored in the content storage unit 600, by checking a scene change point pattern showing points where scene change points within the detection target content detected by the detecting device 90 from the detection target content are present against the scene change point pattern stored in advance in the server 60. Server identification information of the server 60 that provides content identification information and a content is employed here as the watermark information.

FIG. 20 is a diagram illustrating a configuration of a content distribution system according to this embodiment. In this embodiment, the server 60 included in the content distribution system has a feature quantity variation pattern database 605 therein. FIG. 21 is a diagram illustrating a functional configuration of the server 60 according to this embodiment. The server 60 further includes the feature quantity variation pattern database 605, a transmitting/receiving unit 606 and a checking unit 607 in addition to the configuration illustrated in FIG. 2. The functions of the transmitting/receiving unit 606 are implemented by the communication I/F of the server 60 and by executing various programs stored in the main storage unit and the auxiliary storage unit by the CPU of the server 60. The functions of the checking unit 607 are implemented by executing various programs stored in the main storage unit and the auxiliary storage unit by the CPU of the server 60. The feature quantity variation pattern database 605 is a storage area reserved in the auxiliary storage unit, for example, of the server 60.

The feature quantity variation pattern database 605 stores a scene change point pattern of each content stored in the content storage unit 600. The scene change point pattern stored herein may be any of those illustrated in FIGS. 15 to 19 described in the second embodiment, or may show scene change points and histogram variations at the respective scene change points as illustrated in FIG. 22, for example. The scene change point pattern may show scene change point intervals instead of scene change points, and histogram variations at the respective scene change points as illustrated in FIG. 23. Alternatively, the scene change point pattern may show all of scene change points, histogram variations at the respective scene change points and scene change point intervals. Furthermore, the scene change point pattern may show points of scene changes and histogram variations thereof even when such scene changes do not occur. If the scene change point pattern show histogram variations, the scene change point pattern of a detection target content can be checked against the scene change point pattern stored in the feature quantity variation pattern database 605 even when a threshold of the histogram variation used for determining occurrence of a scene change by the detecting device 90 is changed.

Figures 24, 25:
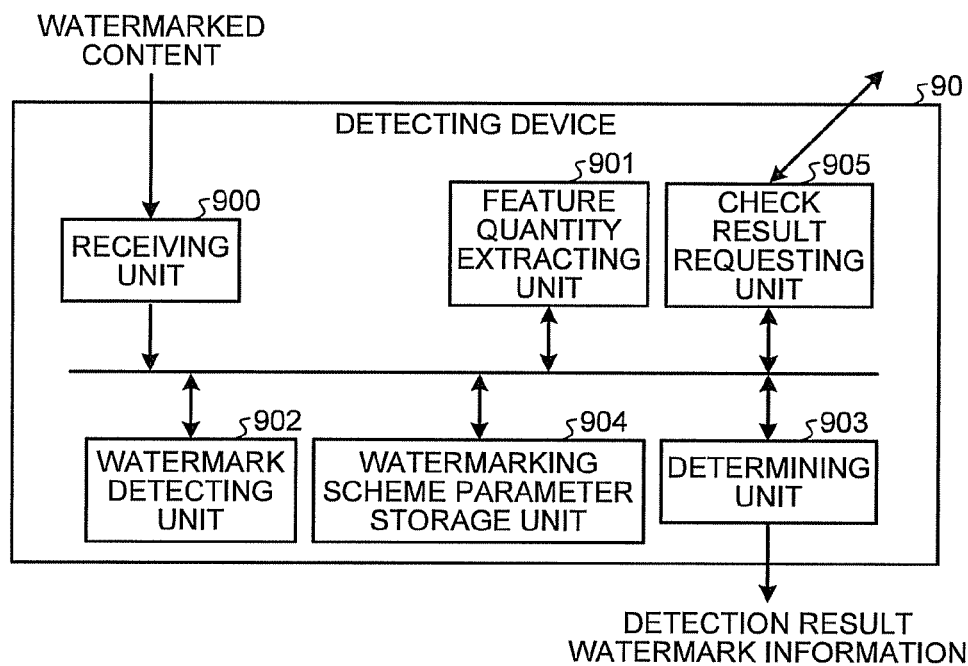
FIG. 24 is a table illustrating a data structure of watermarking scheme parameters.
FIG. 25 is a diagram illustrating a functional configuration of a detecting device.

In this embodiment, the data structure of watermarking scheme parameters stored in the watermarking scheme parameter storage unit 602 is different. The watermarking scheme parameters according to this embodiment indicate the embedding strength of a digital watermark, embedded intervals and an initial vector for embedding the digital watermark, and also indicate starting points of embedding a first component of the initial vector as illustrated in FIG. 24. The example of FIG. 24 illustrates that the starting points of embedding the first component "A" of the initial vector are at 10 seconds, 2 minutes and 20 seconds, 3 minutes and 30 seconds from the beginning of the content, respectively. The starting points are recorded by the watermark embedding unit 603 described below.

The watermark embedding unit 603 embeds the initial vector into a content using the digital watermark embedding strength, the embedded intervals, and the initial vector for embedding the digital watermark indicated by the watermarking scheme parameters stored in the watermarking scheme parameter storage unit 602 in the same manner as in the first embodiment described above. In this process, however, the watermark embedding unit 603 records the starting points of embedding the first component of the initial vector in the watermarking scheme parameters.

The transmitting/receiving unit 606 receives, from the detecting device 90, a check result request that includes a scene change point pattern indicating temporal points within a detection target content where all of or some of scene change points detected from the detection target content are present, and requests identifying of the detection target content. The transmitting receiving unit 606 also transmits, to the detecting device 90, a check result obtained as a result of checking by the checking unit 607, which will be described later, in response to the check result request.

The checking unit 607 refers to the scene change point pattern stored in the feature quantity variation pattern database 605, and checks whether or not the whole or a part thereof is identical or similar to the scene change point pattern contained in the check result request received by the transmitting/receiving unit 606. A method for the checking may be a method disclosed in the following U.S. Pat. No. 6,711,293, for example.

An example of an index for determining whether or not certain two feature quantity variation patterns are similar to each other is a reliability obtained as a result of checking based on feature quantities. A reliability of a check result based on feature quantities of images is a probability of a result of checking extracted feature quantities of images. For example, a reliability is expressed by an inverse of a distance between two feature quantities. A distance between feature quantities may be defined using a sum of absolute differences (SAD) or a sum of square differences (SSD). As the distance between two feature quantities is larger, the reliability is lower. The SAD of two N-dimensional feature quantity vectors vec1 and vec2 is calculated as in the following equation.

$$SAD = \sum_{i=1}^{N} \text{abs}(vec1[i] - vec2[i])$$

where N is a natural number, abs represents an absolute value, vec1[$i$] is an i-th component of vec1, and vec2[$i$] is an i-th component of vec2.

The checking unit 607 performs checking in this manner to search for a scene change point pattern that is identical or similar to the whole of or a part of the scene change point pattern contained in the check result request, and generates a check result containing content identification information of a content corresponding to the scene change point pattern obtained as a result of the searching, relative position information of detection target content to the corresponding content, and embedding starting point information. The relative position information is information indicating what number frame from the beginning of the original content transmitted by the server 60 to the client 70 is coincident with the beginning of the detection target content. The detection target content may be a part of the original content rather than the whole original content transmitted by the server 60 to the client 70. Thus, such relative position information allows the detecting device 90 to know which part of the original content the detection target content corresponds to. The embedding starting point information indicates starting points of embedding the first component of the initial vector indicated by the watermarking scheme parameters stored in association with the content identification information in the watermarking scheme parameter storage unit 602.

FIG. 25 is a diagram illustrating a functional configuration of the detecting device 90. The detecting device 90 further includes a watermarking scheme parameter storage unit 904 and a check result requesting unit 905 in addition to the configuration illustrated in FIG. 9. The functions of the check result requesting unit 905 are implemented by the communication I/F of the server 60 and by executing various programs stored in the main storage unit and the auxiliary storage unit by the CPU of the server 60. The watermarking scheme parameter storage unit 904 is a storage area reserved in the auxiliary storage unit, for example, of the server 60.

The feature quantity extracting unit 901 detects a scene change point of a detection target content received by the receiving unit 900; and extracts a scene change point pattern indicating temporal points within the detection target content where all or some of the scene change points are present. The check result requesting unit 905 transmits, to the server 60, a check result request that includes the scene change point pattern extracted from the detection target content by the feature quantity extracting unit 901, and requests identifying of the detection target content. Then, the check result requesting unit 905 receives a check result transmitted from the server 60 in response to the check request. The check result includes the content identification information; the relative position information; and the embedding starting point information. The watermarking scheme parameter storage unit 904 stores watermarking scheme parameters. The data structure of the watermarking scheme parameters is similar to that in the first embodiment described above.

The watermark detecting unit 902 identifies the detection target content based on the content identification information included in the check result transmitted from the server 60; obtains the watermarking scheme parameters stored in association with the content identification information in the watermarking scheme parameter storage unit 904; determines which part of the original content the detection target content corresponds to by using the relative position information included in the check result; and detects the components of the initial vector as the digital watermark from the detection target content by using the embedding starting point information included in the check result and the watermark information parameters. The determining unit 903 decodes each initial vector detected by the watermark detecting unit 902 to reconstruct the watermark information, and outputs the watermark information.

Next, procedures of a process of detecting a digital watermark from a detection target content by the detecting device 90 according to this embodiment will be described referring to FIG. 26. The detecting device 90 detects scene change points from the whole of or a part of the detection target content, and extracts a scene change point pattern indicating temporal points within the detection target content where all or some of the scene change points are present by the function of the feature quantity extracting unit 901 (step S20). A threshold of the histogram variation used for determining that a scene change occurs may be a predetermined fixed value; may be a value set as a result of once measuring the histogram variation of the detection target content; or may be a value set dynamically in a manner, for example, that different values are set for a first half and for a second half of the detection target content.

Next, the detecting device 90 transmits a check result request that includes the scene change point pattern extracted in step S20 and requests identifying of the detection target content by the functions of the check result requesting unit 905 (step S21). The check result request may include: a threshold of the histogram variation used for determining that a scene change occurs; or, if a threshold is set dynamically, information on intervals where the threshold is set.

Upon receiving the check result request by the functions of transmitting/receiving unit 606, the server 60 refers to the scene change point pattern stored in the feature quantity variation pattern database 605; and checks whether or not the whole or a part of the scene change point pattern included in the check result request is identical or similar thereto by the functions of the checking unit 607. If the checking is performed on a part of the scene change point pattern included in the check result request, processing loads of the server 60 can be reduced. If the checking is performed on the whole scene change point pattern, the check accuracy can be increased. Then, the server 60 transmits the check result to the detecting device 90 by the function of the transmitting/receiving unit 606. The check result includes the content identification information; the relative position information; and the embedding starting point information as described above.

If a threshold of the histogram variation used for determining that a scene change occurs is included in the check result request, the server 60 does not regard a point where the histogram variation is less than the threshold as a scene change point or a feature quantity variation point when the scene change point pattern stored in the feature quantity variation pattern database 605 is such that as illustrated in FIG. 22 or 23; but the server 60 checks whether or not the whole of or a part of the scene change point pattern included in the check result request is identical or similar thereto by the function of the checking unit 607. For example, if the threshold is "120", a point where "10 seconds; histogram variation 100" in the scene change point pattern of FIG. 22 is not regarded as a scene change point or a feature quantity variation point.

Figure 26:
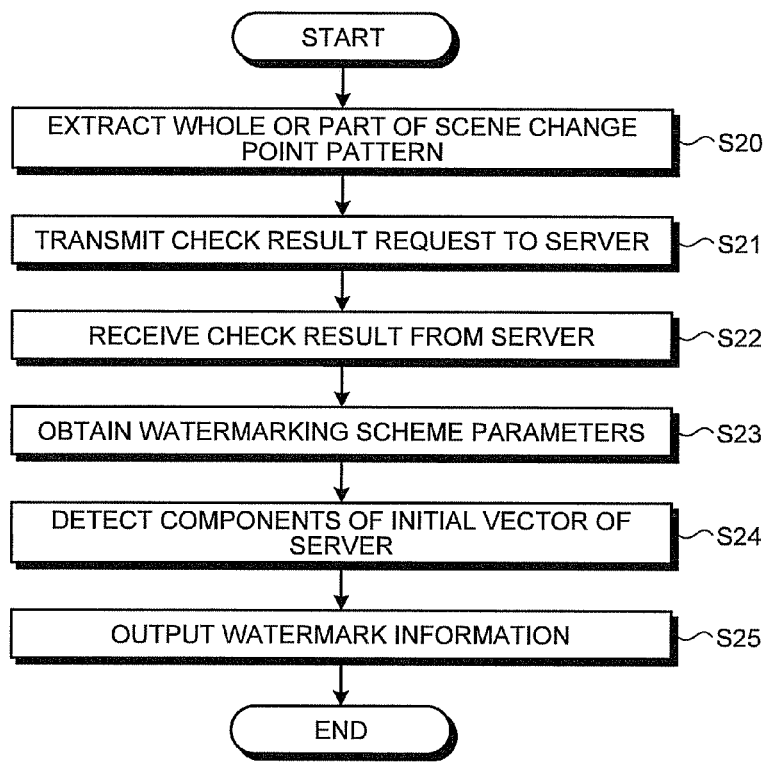
FIG. 26 is a flowchart illustrating procedures performed by the detecting device.

The description refers back to FIG. 26. Upon receiving the check result transmitted from the server 60 by the function of the check result requesting unit 905 (step S22), the detecting device 90 reads out and obtains the watermarking scheme parameters stored in association with the content identification information included in the check result in the watermarking scheme parameter storage unit 904 by the function of the determining unit 903 (step S23). Then, the detecting device 90 determines which part of the original content the detection target content corresponds to by using the relative position information included in the check result; and the detecting device 90 detects the components of the initial vector from the detection target content by using the embedding starting point information included in the check result and the watermarking scheme parameters obtained in step S23 (step S24). In this embodiment, the detecting device 90 can identify a starting point from which the first component of the initial vector is embedded by using the embedding starting point information. Thus, as described in the first embodiment, the detecting device 90 can detect the components of the initial vector by detecting the components from the starting point where the first component of the initial vector is embedded without performing detection in an interval for the length Q from a scene change point or a feature quantity variation point as a starting point as done in step S16 of FIG. 11.

Then, the detecting device 90 decodes the initial vector detected in step S24 to reconstruct the watermark information. As a result, the detecting device 90 obtains the server identification information of the server 60 that has provided the content that is the detection target content. Then, the detecting device 90 outputs the server identification information together with the content identification information included in the check result received in step S22 as the watermark information (step S25).

As described above, according to this embodiment, the intervals into which the components of the initial vector are to be embedded are determined based on the temporal variations of the feature quantity; and when detecting the digital watermark from the detection target content, the detection target content is identified based on the feature quantity variation pattern obtained by extracting the feature quantity; and the components are detected from the intervals where the components are embedded by using the watermarking scheme parameters predetermined for the identified detection target content. Therefore, the detecting device 90 can correctly detect the watermark information, even when the server 60 has divided and embedded the watermark information into the content at respective temporal intervals.

Fourth Embodiment

Next, a fourth embodiment of the information processing device and the computer program product will be described. Parts that are the same as those in the first to the third embodiments described above will be described using the same reference numerals, or description thereof will not be repeated.

In this embodiment, client identification information is employed as the watermark information; and a client 70 performs re-embedding of a digital watermark by embedding the client identification information as a digital watermark into a content into which a server 60 has embedded a digital watermark. However, the information that is re-embedded as a digital watermark by the client 70 is not limited to the client identification information.

For example, the server 60 embeds an initial vector (WM10, WM20, . . . , WML0, . . . , WMN0) ($1<L \leq N$) as a digital watermark into a content. Here, (WM10, WM20, . . . , WML-10) represents content identification information; and (WML0, WML+10, . . . , WMN0) represents the client identification information after the re-embedding by the client 70. The server 60 arbitrarily sets each of the components of (WML0, WML+10, . . . , WMN0), and embeds the initial vector (WM10, WM20, . . . , WML0, . . . , WMN0) into the content. For example, if each component WMi0 ($1 \leq i \leq N$) of the initial vector is one bit representing "0" or "1", (WML0, WML+10, . . . , WMN0)=(0, 0, . . . , 0) may be satisfied.

Figure 27:
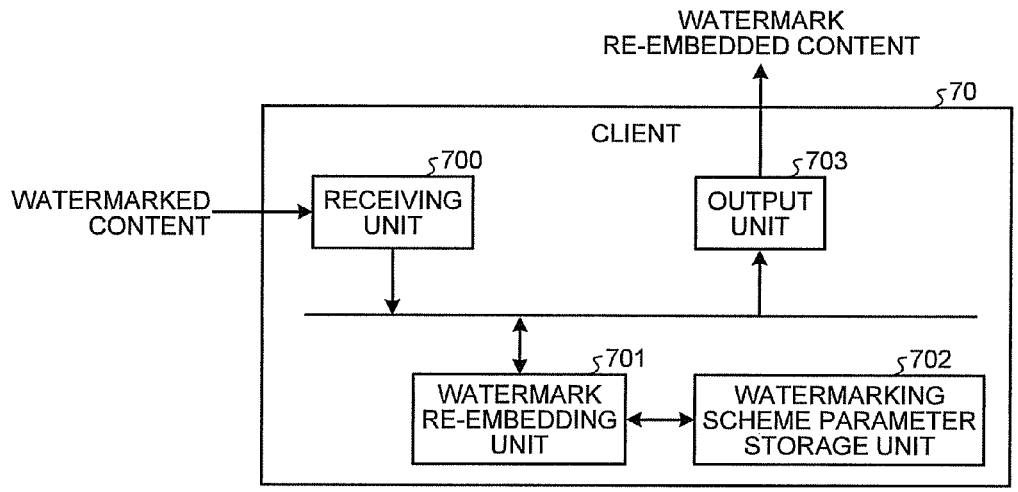
FIG. 27 is a diagram illustrating a functional configuration of a client according to a fourth embodiment.

This embodiment is substantially similar to the first to the third embodiments except that the client 70 re-embeds a digital watermark. Therefore, this embodiment will be described focusing on the configuration of the client 70. FIG. 27 is a diagram illustrating a functional configuration of the client 70. The client 70 includes a receiving unit 700, a watermark re-embedding unit 701, a watermarking scheme parameter storage unit 702 and an output unit 703.

The receiving unit 700 receives a content into which a digital watermark is embedded and which is encrypted from the server 60. The watermarking scheme parameter storage unit 702 stores watermarking scheme parameters for each content identification information item. Watermarking scheme parameters specify a manner in which a digital watermark is embedded, and include an embedding strength of the digital watermark; a point where the digital watermark is embedded (re-embedded position); the initial vector as described above; and a vector indicating digital watermark assigned to the client 70. FIG. 28 is a table illustrating a data structure of the watermarking scheme parameters stored in the watermarking scheme parameter storage unit 702. A digital watermark re-embedded position is information for specifying a position where a digital watermark is to be embedded in content data. For example, if a content is an image, an example of the digital watermark re-embedded position is information specifying a position where a digital watermark is to be embedded in the image. If the content is a moving image, an example of the digital watermark re-embedded position is information specifying a time corresponding to the position in the moving image. For example, it is information specifying a time of 30 seconds from a point after 10 seconds of reproduction from the beginning of the content. A re-embedded vector includes components each corresponding to each re-embedded position described above, and composed of a set of values (re-embedded values) of the digital watermark to be embedded into respective re-embedded positions. Such a re-embedded vector is predetermined so as to be different from the initial vector and different for each client 70. The re-embedded values (WMi1) included in the re-embedded vector may be any values different from the components WMi0 of the initial vector where i is at least one of $1 \leq i \leq N$. For example, if a component WMi0 of the initial vector is a value of one bit representing "0", WMi1 may be a value of one bit representing "1".

In the watermarking scheme parameters illustrated in FIG. 28, the re-embedded vector is different from the initial vector at WM21 where "i=2". In such a configuration, the re-embedded positions of the digital watermark are specified based on the number of frames. According to the watermarking scheme parameters illustrated in FIG. 28, it can be determined that the watermark WM21 is to be embedded into a re-embedded position in a range from a 6001-th frame to a 8000-th at an embedding strength of 40 dB in the SN ratio, and into a re-embedded position in a range from a 8001-th frame to a 12000-th frame at an embedding strength of 45 dB in the SN ratio.

A codeword of codes disclosed in G. Tardos, "Optimal Probabilistic Fingerprint Codes," Proceedings of the 35th Annual ACM Symposium on Theory of Computing, pp. 116-125, 2003 may be used as the re-embedded vector.

It is assumed here that one of codewords of codes disclosed in G. Tardos, "Optimal Probabilistic Fingerprint Codes," Proceedings of the 35th Annual ACM Symposium on Theory of Computing, pp. 116-125, 2003 is CWk, and that this codeword is assigned as a re-embedded vector to a client 70_*k* ($1 \leq k \leq$ the number of clients 70 connected to the communication network NT1). In this case, the client 70_*k* re-embeds a digital watermark only for a component that is different from a corresponding component of the re-embedded vector CWk among the components of the initial vector based on the watermarking scheme parameters. In other words, the client 70_*k* re-embeds the digital watermark so that a vector embedded in the content becomes CWk. Alternatively, a codeword of error correction codes may be used as the re-embedded vector.

The description refers back to FIG. 27. The watermark re-embedding unit 701 re-embeds a digital watermark by newly embedding a digital watermark into the content received by the receiving unit 700 using the watermarking scheme parameters stored in the watermarking scheme parameter storage unit 702. A method for re-embedding a digital watermark into a content where a digital watermark is already embedded may be applied with a method disclosed in JP-A 2004-96476 (KOKAI), for example. The output unit 703 outputs the content into which the watermark re-embedding unit 701 has embedded the digital watermark.

Next, procedures of processes of receiving a content and embedding a watermark performed by the client 70 according to this embodiment will be described referring to FIG. 29. The client 70 receives a content into which a digital watermark is embedded and which is transmitted from the server 60 (step S40). Next, the client 70 obtains watermarking scheme parameters stored in association with content identification information of the content received in step S40 in the watermarking scheme parameter storage unit 702 (step S41), and re-embeds a digital watermark by embedding a digital watermark using the watermarking scheme parameters (step S42). Specifically, for example, according to the watermarking scheme parameters illustrated in FIG. 28, the initial vector is (WM10, WM20, and WM30) and the re-embedded vector is (WM10, WM21, WM30). The client 70 compares the vectors; determines a difference therebetween and the re-embedded position; and embeds a components of the re-embedded vector that is different from that of the initial vector into the re-embedded position. Then, the client 70 outputs the content in which a digital watermark is newly embedded (step S43).

As described above, each client 70 embeds a digital watermark into a content by using a re-embedded vector; and as a result, each initial vector embedded as a digital watermark by the server 60 is changed to the re-embedded vector embedded by each client 70. The re-embedded vector is different for each client 70. Therefore, the detecting device 90 can obtain the client identification information by decoding the re-embedded vector embedded in a leaked content, and identify which client 70 is the leak source, for example. In this manner, the detecting device 90 can also correctly detect watermark information even when the server 60 has divided and embedded the watermark information into a content at respective temporal intervals in this embodiment.

Modified Examples

The invention is not limited to the embodiment presented above without any modification, but may be embodied with various modified components in implementation without departing from the spirit of the inventions when practiced. Further, the invention can be embodied in various forms by appropriately combining a plurality of components disclosed in the embodiment. For example, some of the components presented in the embodiment may be omitted. Further, some components in different embodiments may be appropriately combined. In addition, various modifications as described as examples below may be made.

In the embodiments described above, various programs executed in the server 60 may be stored on a computer system connected to a network such as the Internet, and provided by being downloaded via the network. The various programs may also be recorded on a computer readable recording medium such as a CD-ROM, a flexible disk (FD), a CD-R and a digital versatile disk (DVD) in a form of a file that can be installed or executed, and provided as a computer program product. The same applies to the client 70, the posting server 80 and the detecting device 90.

In the embodiments described above, the detecting device 90 may be included in at least one of the server 60, the client 70, and the posting server 80.

In the embodiments described above, a feature quantity of audio may be used instead of the feature quantity of an image. In such a configuration, the feature quantity variation pattern indicates temporal points in a content where feature quantity variations of audio are present. Examples of a feature quantity of audio include a short-time frequency spectrum, a code spectrum, and a histogram thereof as disclosed in JP-A 2004-519015 (KOHYO). In addition, various feature quantities may be used such as a cepstrum feature quantity, a peak frequency where only a partial frequency is used as a feature, and a method of expressing a spectrum with a limited number of words by vector quantization.

Moreover, in the third embodiment, the feature quantity variation pattern database 605 stores a feature quantity variation pattern of feature quantities of audio; and the server 60 checks the feature quantity variation pattern of the feature quantities of audio in response to the check result request transmitted from the detecting device 90. A reliability of a check result based on feature quantities of audio is a probability of a result of checking extracted feature quantities of audio. Methods for checking and determining the reliability may be applied with methods disclosed in JP-A 2007-157064 (KOKAI), for example.

Furthermore, in the embodiments described above, a plurality of feature quantities including feature quantities of images and feature quantities of audio may be used in combination, or a plurality of other feature quantities may be used in combination.

Figure 30:
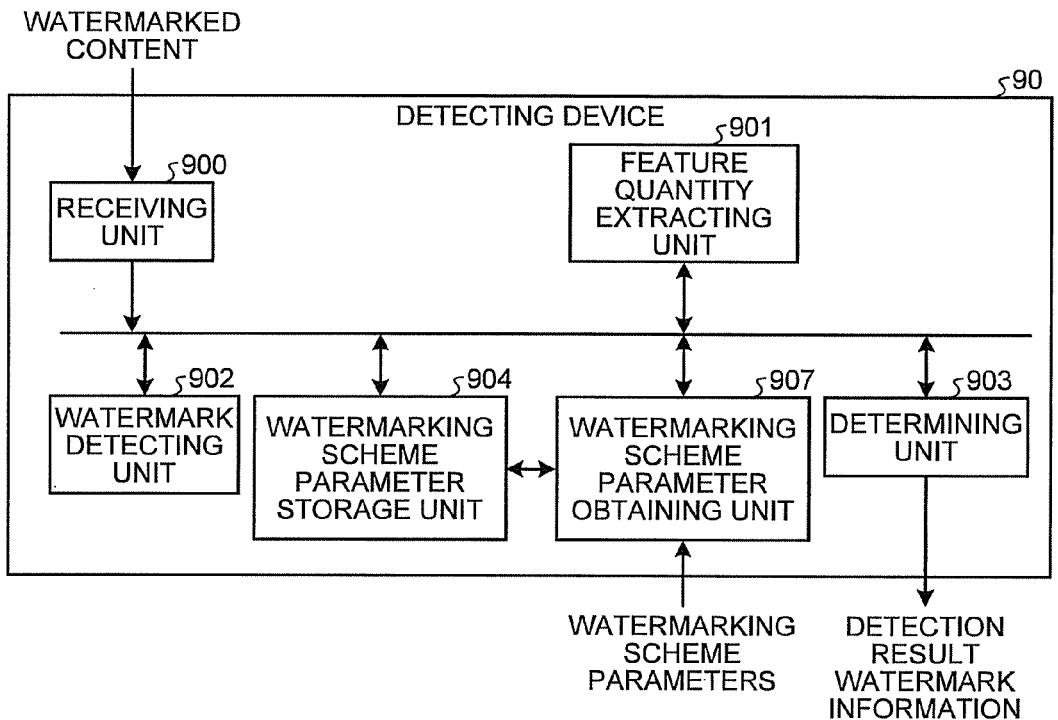
FIG. 30 is a diagram illustrating a functional configuration of a detecting device according to one modified example.
Figure 31:
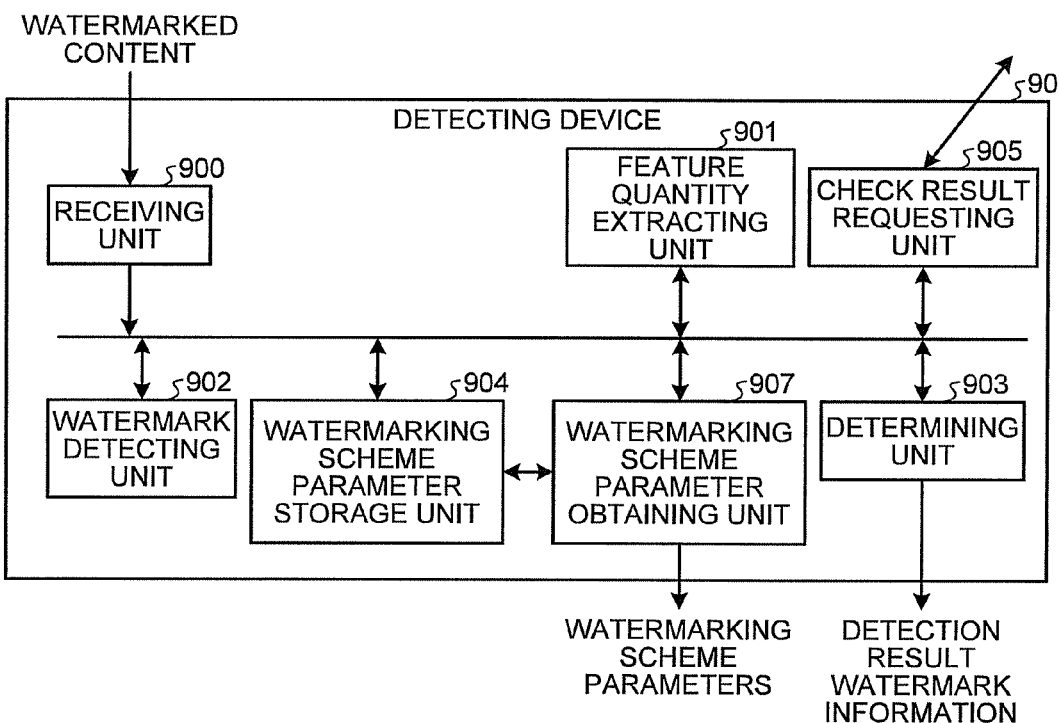
FIG. 31 is a diagram illustrating a functional configuration of a detecting device according to one modified example.

In the embodiments described above, the detecting device 90 may obtain the watermarking scheme parameters from other devices. In this case, the detecting device 90 further includes a watermarking scheme parameter obtaining unit 907 and a watermarking scheme parameter storage unit 904 as illustrated in FIGS. 30 and 31. The watermarking scheme parameter obtaining unit 907 receives watermarking scheme parameters from other devices that holds the parameters and stores the received parameters in the watermarking scheme parameter storage unit 904.

The server 60 may obtain watermarking scheme parameters externally or the server 60 may generate watermarking scheme parameters.

In addition, in the third embodiment described above, the output unit 604 of the server 60 may also output watermarking scheme parameters associated with content identification information, for example. In this case, the transmitting/receiving unit 606 may include the watermarking scheme parameters associated with the content identification information into a check result and may transmit the check result to the detecting device 90. The watermark detecting unit 902 of the detecting device 90 may detect a digital watermark from a detection target content by using watermarking scheme parameters transmitted from the server 60. In such a configuration, the detecting device 90 may be configured without the watermarking scheme parameter storage unit 904.

In the embodiments described above, the watermarking scheme parameters are not limited to those illustrated in FIGS. 5 to 7. For example, the watermarking scheme parameters may be as illustrated in FIG. 32. ti ($8 \leq i \leq 20$) in FIG. 32 corresponds to ti in FIG. 4.

In the first embodiment described above, the SN ratio is used as the embedding strength of a digital watermark in the watermarking scheme parameters. However, the embedding strength is not limited thereto, and a peak signal-to-noise ratio may be used as illustrated in FIG. 33.

In the first embodiment described above, the server 60 may adaptively set the embedding strength of a digital watermark based on an image degradation level by using a method disclosed in JP-A 2006-140934 (KOKAI), for example, in embedding of the digital watermark.

In a case where a content is encoded, if a peak signal-to-noise ratio of a frame before being encoded and a frame after being encoded is used as the image degradation level, the watermarking scheme parameters are as illustrated in FIG. 33. The server 60 measures the peak signal-to-noise ratio of a frame before being encoded and a frame after being encoded, and determines the digital watermark embedding strength for a next frame based on the measured value and setting conditions on the digital watermark embedding strength indicated by the watermarking scheme parameters illustrated in FIG. 33. The digital watermark can be made less perceptible and the detecting accuracy can be improved by adaptively setting the digital watermark embedding strength based on the image degradation level.

In the fourth embodiment described above, the client 70 may detect a starting point from which re-embedding is started by the method described in the first embodiment or the third embodiment in re-embedding a digital watermark. The client 70 may also calculate a reliability of a digital watermark before re-embedding the digital watermark and may adjust the re-embedding strength. The re-embedding strength may be adjusted by using the method disclosed in JP-A 2006-140934 (KOKAI) mentioned above. Accordingly, it is possible to make the digital watermark less perceptible and improve the detection accuracy.

It is assumed in the first embodiment described above that the digital watermark embedding strength and the digital watermark embedded intervals in the watermarking scheme parameters are fixed for the content distribution system. However, these are not limited thereto. It is also assumed that the number of components included in the initial vector is fixed for the content distribution system. However, the number of components is not limited thereto.

Figure 34:
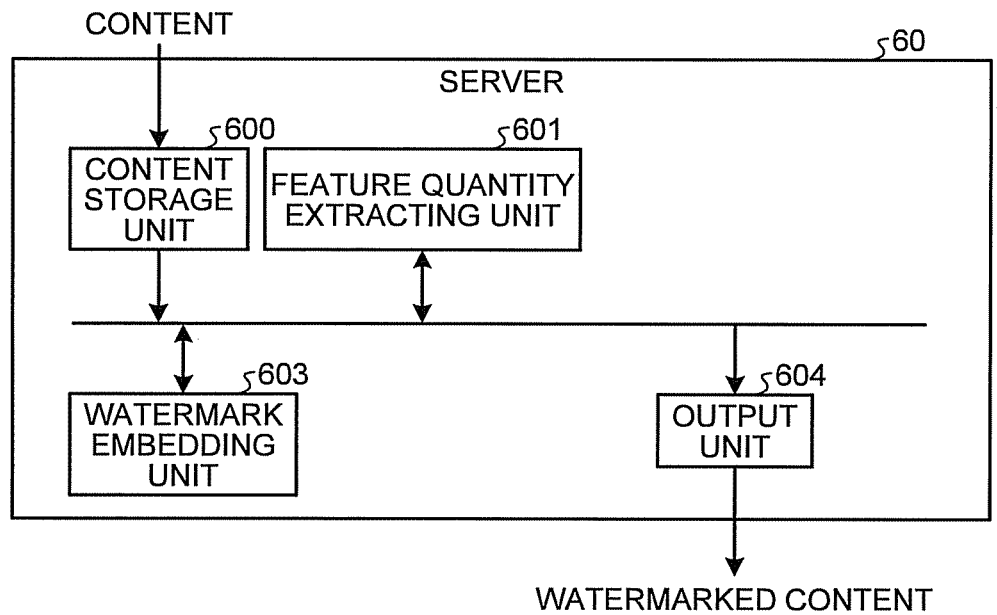
FIG. 34 is a diagram illustrating a functional configuration of a server according to one modified example.

In the first embodiment described above, the server 60 is configured to embed a digital watermark into a content by using watermarking scheme parameters stored in association with content identification information in the watermarking scheme parameter storage unit 602. However, the configuration is not limited thereto. For example, if parameters that are set in the watermarking scheme parameters are fixed and used in common for all contents in the server 60, the parameters need not be associated with the content identification information. Thus, the server 60 need not have the watermarking scheme parameter storage unit 602 as illustrated in FIG. 34. For example, if the initial vector is fixed (for example, if only server identification information of the server 60 that provides a content is embedded as a digital watermark) and if the embedding strength and embedded intervals of the digital watermark are fixed, the parameters that are set in the watermarking scheme parameters can be fixed for the server 60. Alternatively, for example, watermarking scheme parameters may be added to a content stored in the content storage unit 600, and the server 60 may extract the watermarking scheme parameters from the content stored in the content storage unit 600 and embed a digital watermark into the content by using the extracted watermarking scheme parameters and by the functions of the watermark embedding unit 603.

In the embodiments described above, the server 60 may store an encrypted content. If a content into which a digital watermark is to be embedded is encrypted, the server 60 decrypts the content before performing the process of step S1 in FIG. 10. If, for example, a content is compressed (encoded) according to a compression scheme such as MPEG-2 and H.264, the server 60 expands (decodes) the encoded content before performing the process of step S1. However, this decoding process is performed before the process of step S1 if a method of detecting a scene change point from a baseband signal is used as a method for detecting a scene change point; but this decoding process need not be performed before the process of step S1 if a method of detecting a scene change point from the encoded content is used. Further, this decoding process is performed before the process of step S3 if a method of embedding a digital watermark into a baseband signal is used as a method for embedding a digital watermark (and if a decoding process is not performed before that); but this decoding process is not needed if a method of embedding a digital watermark into the encoded content is used and if a method of detecting a scene change point from the encoded content is used.

Figure 11:
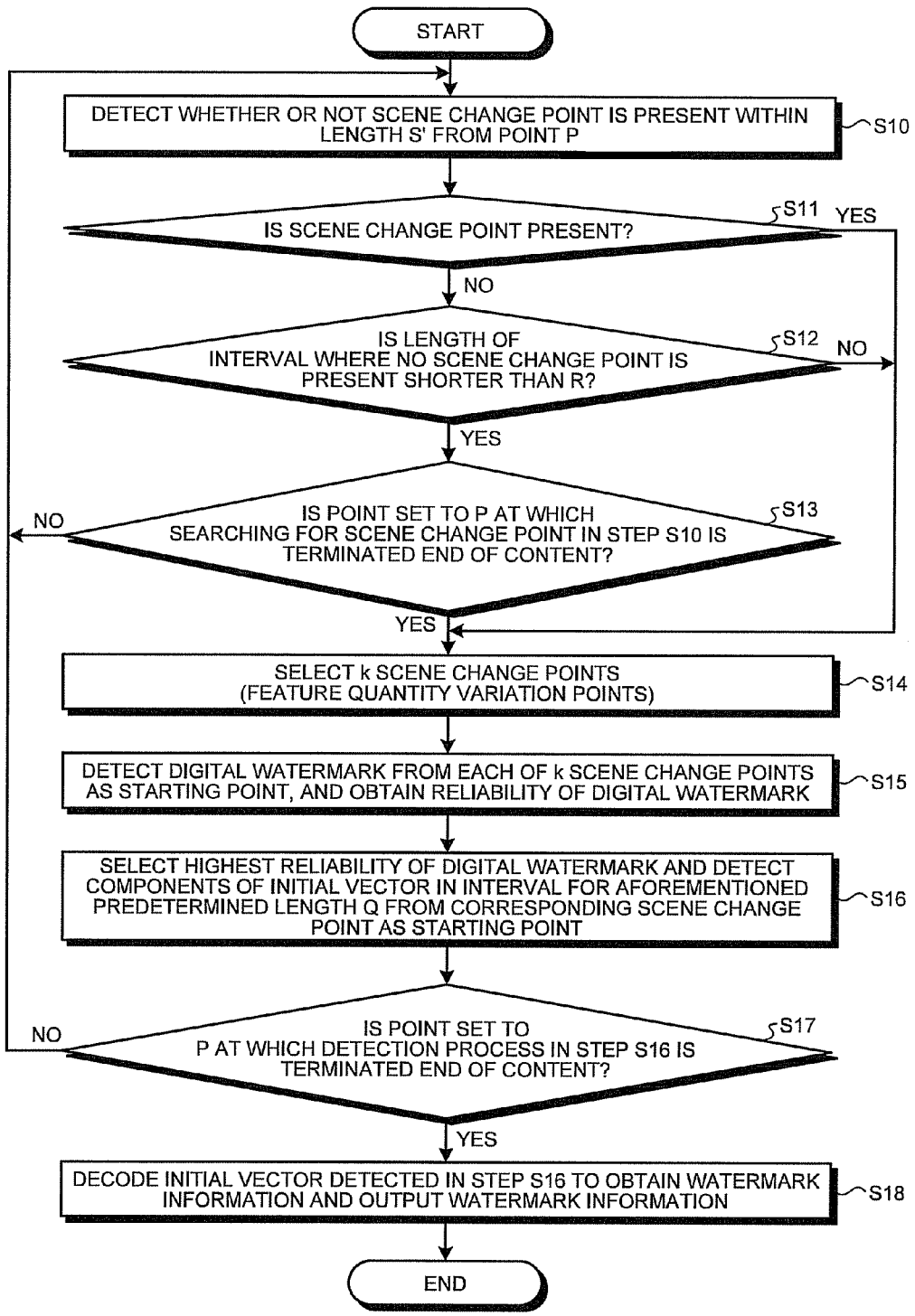
FIG. 11 is a flowchart illustrating procedures performed by the detecting device.

Similarly, if a content obtained by the detecting device 90 from the posting server 80 is encrypted, the detecting device 90 decrypts the content before performing the process of step S10 in FIG. 11. If, for example, a content is compressed (encoded) according to a compression scheme such as MPEG-2 and H.264, the detecting device 90 expands (decodes) the encoded content before performing the process of step S10. However, this decoding process is performed before the process of step S10 if a method of detecting a scene change point from a baseband signal is used as a method for detecting a scene change point, but this decoding process need not be performed before the process of step S10 if a method of detecting a scene change point from the encoded content is used. Further, this decoding process is performed before the process of step S16 if a method of embedding a digital watermark into a baseband signal is used as a method for embedding a digital watermark (and if a decoding process is not performed before that), but this decoding process is not needed if a method of embedding a digital watermark into the encoded content is used and if a method of detecting a scene change point from the encoded content is used.

Figure 35:
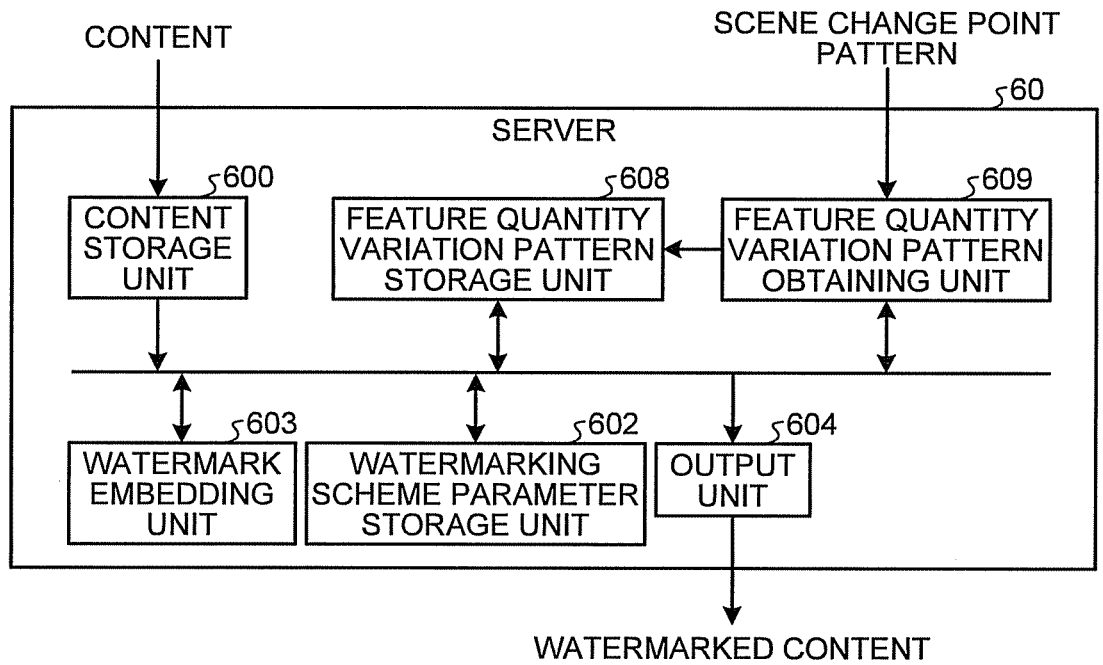
FIG. 35 is a diagram illustrating a functional configuration of a server according to one modified example.

In the first embodiment described above, the process of detecting a scene change point is performed by the server 60. However, this process may be performed by a device other than the server 60. In this case, as illustrated in FIG. 35, the server 60 need not have the feature quantity extracting unit 601, and further includes a feature quantity variation pattern obtaining unit 609. The feature quantity variation pattern obtaining unit 609 obtains a scene change point pattern from the device other than the server 60 and stores the obtained scene change point pattern in the feature quantity variation pattern storage unit 608. The watermark embedding unit 603 may be configured to embed an initial vector into a content by using the watermarking scheme parameters stored in the watermarking scheme parameter storage unit 602 based on the scene change point pattern stored in the feature quantity variation pattern storage unit 608.

In the first embodiment described above, the detecting device 90 may check a format of the detected initial vector or the reconstructed watermark information in step S18 of FIG. 11. For example, the first component of the initial vector may be set to be always a fixed value, and the detecting device 90 may check whether or not the first component of the initial vector detected in step S16 is the fixed value in step S18. Alternatively, for example, an initial vector including a checksum may be set in encoding watermark information, and the detecting device 90 may check the checksum of the initial vector detected in step S16 in step S18. Alternatively, in encoding watermark information, error correction encoding may be performed; the initial vector may be set to be a codeword of an error correcting code; and the detecting device 90 may perform error correction on the initial vector detected in step S16 in step S18. Alternatively, the initial vector may be set to a codeword of a code disclosed in G. Tardos, "Optimal Probabilistic Fingerprint Codes," Proceedings of the 35th Annual ACM Symposium on Theory of Computing, pp. 116-125, 2003 mentioned above, and the detecting device 90 may decode the initial vector detected in step S16 in step S18.

In detecting an initial vector, there is a possibility that a detection error of a component thereof is caused or a component thereof cannot be detected. If the detecting device 90 performs the process according to the modified examples, the detection error of such a component can be detected and corrected, and such a component that cannot be detected can be compensated for. Therefore, the accuracy of the watermark information output in step S18 can be improved. If a plurality of candidates of the watermark information is output in step S18, the candidates can be further narrowed down by performing the process according to the modified examples by the detecting device 90.

In the first embodiment described above, the detecting device 90 detects the components of the initial vector by selecting the highest reliability of the digital watermark and using one scene change point or feature quantity variation point corresponding thereto as a candidate in step S16 of FIG. 11. However, the detection of the components of the initial vector is not limited thereto and may be performed by selecting a plurality of reliabilities of the digital watermark in descending order from the highest and using a plurality of scene change points or feature quantity variation points corresponding thereto, respectively, as candidates. In this case, the detecting device 90 reconstructs and outputs a plurality of watermark information items in step S18 based on the result of detection.

Similarly, in the third embodiment, if a plurality of content identification information items are included in the check result received by the detecting device 90 in step S22, that is, if the check result transmitted from the server 60 includes a plurality of candidates of contents that are identified as contents corresponding to the detection target content, the detecting device 90 may obtain watermarking scheme parameters associated with the respective content identification information items included in the check result from the watermarking scheme parameter storage unit 904 in step S23, and detect the components of the initial vector from the detection target content by using the respective obtained watermarking scheme parameters in step S24. In this case, the detecting device 90 may decode each of the detected initial vectors to reconstruct the plurality of watermark information items in step S24, and may output a plurality of sets of the plurality of server identification information items obtained as a result of reconstruction and the content identification information items used to reconstruct the server identification information items as candidates of the watermark information in step S25. Even if one content identification information item is included in the check result received by the detecting device 90 in step S22, the detecting device 90 may output a plurality of candidates of the watermark information in step S25. A method for selecting one from a plurality of candidates may be any of the methods described above.

Alternatively, a method for selecting one from a plurality of candidates may be as follows. It is assumed here that the watermark information that is to be reconstructed by decoding the components of the initial vector is content identification information. In step S24 of FIG. 26, the detecting device 90 detects the components of the initial vector from the detection target content by using the watermarking scheme parameters obtained in step S23 and decodes the detected components to reconstruct the content identification information as the watermark information by the function of the watermark detecting unit 902. Then, the detecting device 90 determines whether or not the reconstructed content identification information is identical or similar to the content identification information included in the check result received in step S22 by the function of the determining unit 903. The detecting device 90 performs this determination on each of the content identification information items included in the check result received in step S22, and output one or a plurality of content identification information items in descending order of probability as final watermark information. A method for determining the coincidence or similarity of the content identification information may be a method of determining that the coincidence or similarity is higher as a Hamming distance when the content identification information is assumed to be a codeword is smaller, for example. The candidates in steps S24 and S25 can also be narrowed down by this method.

In the first embodiment described above, when the detecting device 90 divides a frame constituting the detection target content into a plurality of regions and the initial vector is embedded into each of the regions obtained by the division, the detecting device 90 may calculate the reliability of the digital watermark for each of the regions obtained by the division in step S15. Moreover, when the first component WM10 of the initial vector is always embedded from a scene change point and the whole initial vector is embedded from the scene change point as a starting point, the detecting device 90 may calculate the reliability of detection of the whole initial vector in step S16.

If the first component WM10 is not always embedded from a scene change point, that is, if it is unknown to which component of the initial vector the component detected in step S16 corresponds, the detecting device 90 may use a cyclic permutation code as the initial vector. Methods for encoding and decoding a cyclic permutation code are disclosed in E. N. Gilbert, "Cyclically permutable error-correcting codes", IEEE Trans. Inform. Theory, vol. 9, pp. 175-182, July 1963, for example.

In the first embodiment described above, the detecting device 90 may calculate the reliability of the digital watermark by assuming a point that is one or more frames ahead or before the scene change point or the feature quantity variation point selected in step S14 as a starting point in step S16. For example, if the client 70 has re-encoded the content and uploaded the re-encoded content onto a posting site, there is a possibility that the scene change point or the feature quantity variation point selected in step S14 is not consistent with the actual scene change point or the actual feature quantity variation point. If the reliability of the digital watermark is calculated by shifting the starting point, the actual scene change point or the actual feature quantity point, namely, the correct starting point can be obtained. Thus, the detecting accuracy can be increased.

In the third embodiment described above, the check result transmitted by the server 60 to the detecting device 90 may include a scene change point pattern associated with the content identification information. In this case, the check result need not include the embedding starting point information.

In the third embodiment described above, the scene change point pattern may further indicate histogram amounts of a frame immediately before and a frame immediately after each scene change point as illustrated in FIG. 36. In this case, a scene change point pattern included in the check result request transmitted by the detecting device 90 in step S21 of FIG. 26 indicates temporal points within the detection target content where all of or some of the scene change points detected in step S20 are present and histogram amounts of a frame immediately before and a frame immediately after each of the scene change points extracted in step S20. For checking the scene change point patterns, the server 60 determines the reliability of the check result based on whether or not the histogram amounts indicated by the scene change point pattern included in the check result request transmitted from the detecting device 90 are identical or similar to the histogram amounts indicated by the scene change point pattern stored in the feature quantity variation pattern database 605 as one of indices.

Alternatively, instead of the histogram amount of a frame immediately before each scene change point, the scene change point pattern may indicate a histogram amount of a frame that is Z frames before each scene change point and the value of Z, where Z is a natural number, or the scene change point pattern may indicate information on histogram amounts of a plurality of frames before each scene change point and how many number of frames before each scene change point the frames are. Also in this case, the scene change point pattern may indicate the histogram variations as illustrated in FIGS. 22 and 23. The same applies to the histogram amount of the frame immediately after each scene change point. In this manner, the detection accuracy of the watermark information can be improved.

In the third embodiment described above, the feature quantity variation pattern database 605 is included in the server 60. Alternatively, the feature quantity variation pattern database 605 may be included in any of the detecting device 90, the client 70 and the posting server 80, or may be included in another device. In this case, the output unit 604 of the server 60 outputs the content in which the initial vector is embedded and the scene change point pattern of the content, and transmits the output content and the output scene change point pattern to a device (referred to as a database device) that includes the feature quantity variation pattern database 605. The database device may store the scene change point pattern transmitted from the server 60 in the feature quantity variation pattern database 605. Further, the detecting device 90 transmits the check result request as described above to the database device. Upon receiving the check result request, the database device may refer to the scene change point pattern stored in the feature quantity variation pattern database 605, check whether or not the scene change point pattern included in the check result request is identical or similar thereto, and transmit the check result to the detecting device 90. If the detecting device 90 includes the feature quantity variation pattern database 605, the detecting device 90, instead of the server 60, includes the checking unit 607 as illustrated in FIG. 37. The check result requesting unit 905 transmits the check result request to the checking unit 607. The checking unit 607 performs checking similarly to that described in the second embodiment.

Figure 38:
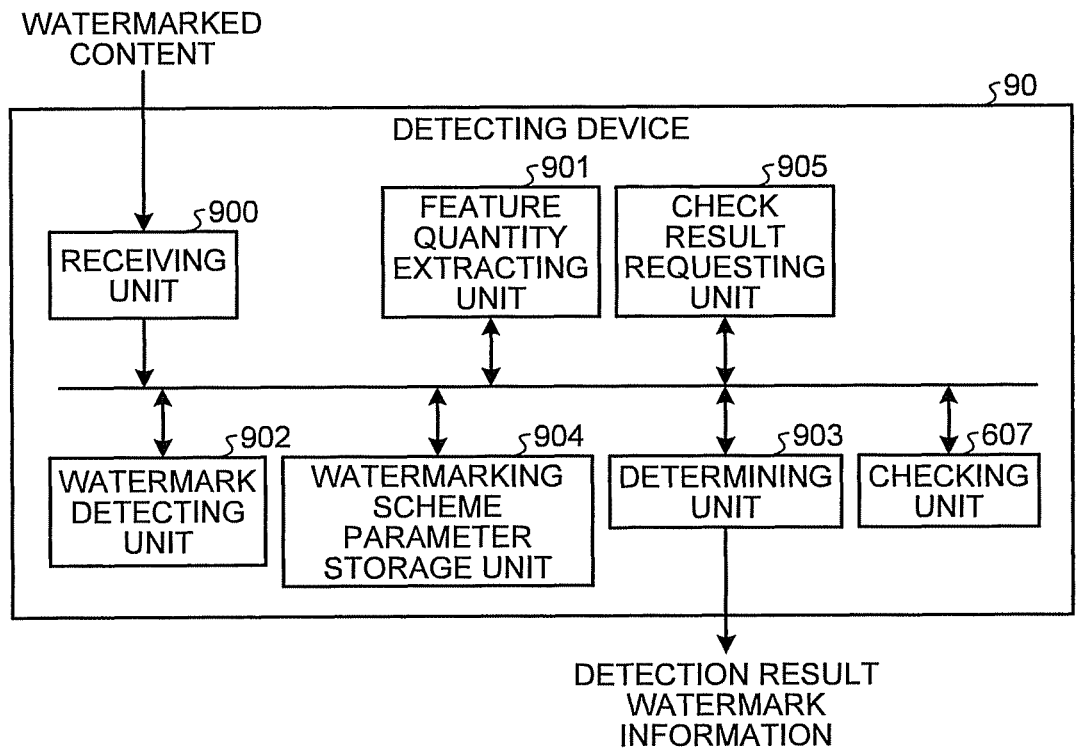
FIG. 38 is a diagram illustrating a functional configuration of a detecting device according to one modified example.

The configuration is not limited thereto. Alternatively, it may be configured such that the server 60 includes the feature quantity variation pattern database 605, and the detecting device 90 includes the checking unit 607 as illustrated in FIG. 38, or it may be configured such that the server 60 includes the checking unit 607 and the detecting device 90 includes the feature quantity variation pattern database 605, for example. The checking process performed by the checking unit 607 may be performed by any of the server 60 and the detecting device 90, or may be performed by another information processing device other than these devices, or may be shared or divided between the server 60 and the detecting device 90. For example, the process may be divided in a manner that the content identification information is roughly narrowed down as a check result in the server 60; and the content identification information is further narrowed down in the detecting device 90. It is possible to avoid excessive processing loads on one of the devices by dividing the checking process.

In the third embodiment described above, the feature quantity extracting unit 601 of the server 60 may detect scene change points from a content obtained by arranging the detection target content linearly in the time direction, and the output unit 604 may output a pattern representing temporal points within the content where the scene change points are present as the scene change point pattern. Moreover, the feature quantity extracting unit 601 may detect scene change points from a content obtained by removing commercial message parts from the detection target content; and the output unit 604 may output a pattern representing temporal points within the content where the scene change points are present as the scene change point pattern. A content that is uploaded onto a posting site is a version obtained by arranging an original content linearly in the time direction and/or by removing commercial message parts. Therefore, if a scene change point pattern obtained by assuming such modification is stored in the feature quantity variation pattern database 605 and the server 60 performs checking by using the scene change point pattern, it is possible to increase the accuracy of detecting the watermark information.

Figure 39:
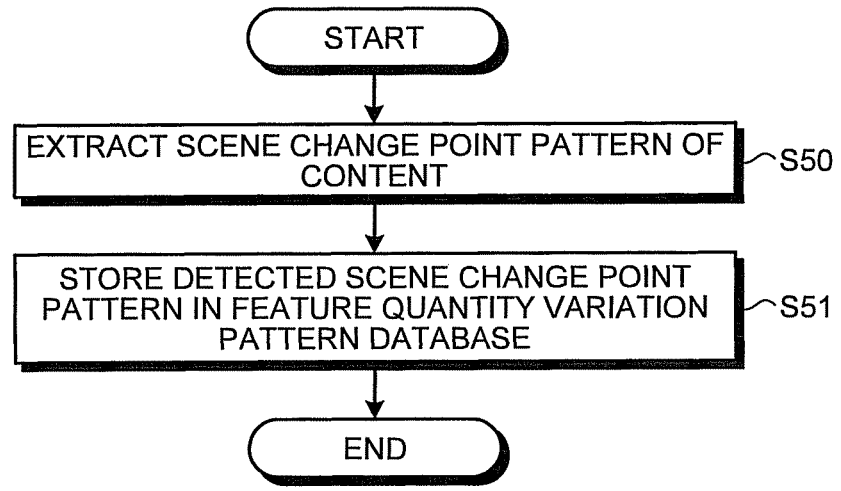
FIG. 39 is a flowchart illustrating procedures performed by a server according to one modified example.
Figure 40:
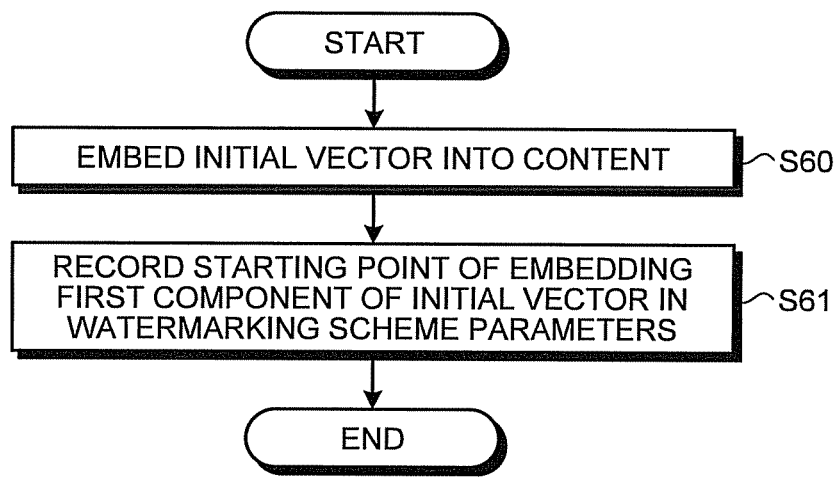
FIG. 40 is a flowchart illustrating procedures performed by a server according to one modified example.

In the third embodiment described above, an example, where a starting point of embedding a digital watermark is coincident with a scene change point, is described. Alternatively, a starting point of embedding a digital watermark may be determined regardless of a scene change point. FIGS. 39 and 40 are flowcharts illustrating processes performed by the server 60 according to the modified examples. As illustrated in FIG. 39, the server 60 extracts a scene change point pattern of a content stored in the content storage unit 600 (step S50). Next, the server 60 stores the scene change point pattern extracted in step S50 in the feature quantity variation pattern database 605 (step S51). In addition, as illustrated in FIG. 40, the server 60 embeds an initial vector in the content stored in the content storage unit 600 (step S60). Next, the server 60 records a starting point of the first component of the initial vector in association with content identification information of the content in watermarking scheme parameters stored in the watermarking scheme parameter storage unit 602 (step S61). The server 60 may perform one of the process illustrated in FIG. 39 and the process illustrated in FIG. 40 before the other, or may perform these processes at the same time. With such a configuration, the flexibility of mounting the server 60 can be increased.

In the third embodiment described above, if a plurality of content identification information items is included in the check result transmitted from the server 60 in response to the check result request, the detecting device 90 may extract a scene change point pattern from an original image of the content associated with the content identification information. An original image of the content is an image constituting the content that is not processed by a user of the content or the like after the content is produced by the content creator, and may be obtained from the content creator or the like, for example. In FIG. 26, if a plurality of content identification information items are included in the check result received in step S22 and the detecting device 90 extracts scene change point patterns of contents corresponding to the respective content identification information items, the process returns to step S21 where the detecting device 90 transmits, to the server 60, a check result request requesting checking of the extracted scene change point patterns against the scene change point pattern stored in the feature quantity variation pattern database 605. The check result request includes the plurality of content identification information items included in the check result received in step S22 and some of or all of the scene change point patterns associated with the respective content identification information items and extracted by the detecting device 90. The server 60 determines whether or not the scene change point patterns associated with the respective content identification information items included in the received check result request are identical or similar to the scene change point patterns stored in the feature quantity variation pattern database 605 in association with the respective content identification information items. As a result of checking based on the feature quantities, the server 60 selects one or more contents in descending order of the reliability, and transmits, to the detecting device 90, the check result including the content identification information items of the respective contents. Upon receiving the check result from the server 60 in step S22, the detecting device 90 performs the processes as described above in the modified examples if the check result includes a plurality of content identification information items, or the process proceeds to step S23 if the check result includes one content identification information item. The process of step S23 and subsequent steps is the same as that in the third embodiment described above.

A content that is uploaded on a posting site may have a degraded image quality as a result of being re-encoded or the like. Thus, if a scene change point pattern of an original image of the content is used, it is possible to further narrow down the content identification information of the content to be identified as a result of checking. Therefore, the detecting accuracy of the watermark information that is finally output from the detecting device 90 is increased. In addition, if the number of candidates of the content to be identified as a result of checking, namely, the number of content identification information items to be included in the check result, is reduced, the number of iterations of the process in steps S24 and S25 can be reduced, and it is thus possible to make the process in steps S24 and S25 more efficient.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device, comprising:
   an extracting unit configured to extract a variation of a feature quantity of a content between a previous frame and a next frame at a display time;
   a first detecting unit configured to detect a point in the content where the variation of the feature quantity is a first predetermined amount or more, wherein the point is where a watermark information starts to be embedded;
   a second detecting unit configured to detect components of the watermark information including components corresponding to respective intervals in the content, based on the point;
   a determining unit configured to determine a reliability of the watermark information that is detected; and
   a selecting unit configured to select a first watermark information from the watermark information based on a result of determination determined by the determining unit.

2. The device according to claim 1, wherein
   the first detecting unit, when no point where the variation of the feature quantity is the first predetermined amount or more is detected in an interval of a first predetermined length in the content, selects a point in the interval of the first predetermined length in the content based on magnitude of the variation of the feature quantity.

3. A computer program product comprising a non-transitory computer-readable medium including programmed instructions for information processing, wherein the instructions, when executed by a computer, cause the computer to perform:
   extracting a variation of a feature quantity of a content between a previous frame and a next frame at display time;
   first detecting configured to detect a point in the content where the variation of the feature quantity is a first predetermined amount or more, wherein the point is where a watermark information starts to be embedded;
   second detecting configured to detect components of the watermark information including components corresponding to respective intervals in the content, based on the point;
   determining a reliability of detected watermark information that is detected; and
   selecting a first watermark information from the watermark information based on a result at the determining.

* * * * *